United States Patent
Kawabata et al.

(10) Patent No.: US 9,890,676 B2
(45) Date of Patent: Feb. 13, 2018

(54) EXHAUST GAS PURIFICATION CATALYST DEVICE AND EXHAUST GAS PURIFICATION METHOD

(71) Applicant: MAZDA MOTOR CORPORATION, Hiroshima (JP)

(72) Inventors: Hisaya Kawabata, Hiroshima (JP); Yasuhiro Matsumura, Hiroshima (JP); Hiroshi Yamada, Hiroshima (JP); Masahiko Shigetsu, Hirgashi-Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/023,129

(22) PCT Filed: May 18, 2015

(86) PCT No.: PCT/JP2015/002499
§ 371 (c)(1),
(2) Date: Mar. 18, 2016

(87) PCT Pub. No.: WO2016/031104
PCT Pub. Date: Mar. 3, 2016

(65) Prior Publication Data
US 2016/0222851 A1 Aug. 4, 2016

(30) Foreign Application Priority Data
Aug. 29, 2014 (JP) .................................. 2014-174853

(51) Int. Cl.
*F01N 3/00* (2006.01)
*F01N 3/10* (2006.01)
(Continued)

(52) U.S. Cl.
CPC ....... *F01N 3/0814* (2013.01); *B01D 53/9477* (2013.01); *B01J 21/04* (2013.01);
(Continued)

(58) Field of Classification Search
CPC ........ F01N 3/0814; F01N 3/0835; F01N 3/10; F01N 3/281; F01N 13/0097;
(Continued)

(56) References Cited

U.S. PATENT DOCUMENTS

| 6,634,168 B1 | 10/2003 | Yamamoto | |
| 8,881,504 B2 * | 11/2014 | Gonze | B60R 16/03 60/284 |
| 2012/0060472 A1 * | 3/2012 | Li | B01D 53/9422 60/274 |

FOREIGN PATENT DOCUMENTS

| JP | 2001-025645 A | 1/2001 |
| JP | 2003-343252 A | 12/2003 |

(Continued)

OTHER PUBLICATIONS

International Search Report and Written Opinion issued in Application No. PCT/JP2015/002499, dated Aug. 4, 2015.

*Primary Examiner* — Phutthiwat Wongwian
*Assistant Examiner* — Diem Tran
(74) *Attorney, Agent, or Firm* — Studebaker & Brackett PC

(57) ABSTRACT

A device includes a first catalyst 41 including a Pd-containing catalyst layer and a Rh-containing catalyst layer and a second catalyst 42 containing Pt-loaded alumina and containing neither Rh nor Pd. The first catalyst or the second catalyst are disposed in one place in such a manner that one of the first catalyst 41 or the second catalyst 42 is located upstream of the other in a flow direction of an exhaust gas from an engine 1.

13 Claims, 12 Drawing Sheets

(51) Int. Cl.
*F01N 3/08* (2006.01)
*B01J 23/63* (2006.01)
*B01J 37/02* (2006.01)
*B01J 35/00* (2006.01)
*B01J 21/04* (2006.01)
*B01J 23/44* (2006.01)
*B01J 35/04* (2006.01)
*F01N 13/00* (2010.01)
*B01D 53/94* (2006.01)
*F01N 3/28* (2006.01)

(52) U.S. Cl.
CPC ............... *B01J 23/44* (2013.01); *B01J 23/63* (2013.01); *B01J 35/0006* (2013.01); *B01J 35/04* (2013.01); *B01J 37/0244* (2013.01); *B01J 37/0248* (2013.01); *F01N 3/0835* (2013.01); *F01N 3/281* (2013.01); *F01N 13/0093* (2014.06); *F01N 13/0097* (2014.06); *B01D 53/944* (2013.01); *B01D 53/945* (2013.01); *B01D 2255/1021* (2013.01); *B01D 2255/1023* (2013.01); *B01D 2255/1025* (2013.01); *B01D 2255/2092* (2013.01); *B01D 2255/407* (2013.01); *B01D 2255/908* (2013.01); *B01D 2255/9022* (2013.01); *B01D 2255/912* (2013.01); *F01N 2510/06* (2013.01); *F01N 2570/12* (2013.01)

(58) Field of Classification Search
CPC ....... F01N 2570/12; F02B 23/10; B01J 21/04; B01J 23/44; B01J 23/63; B01J 35/0006; B01J 35/04; B01J 37/0244; B01J 37/0248
USPC .................................................. 60/285, 299
See application file for complete search history.

(56) References Cited

FOREIGN PATENT DOCUMENTS

| | | |
|---|---|---|
| JP | 2005-329339 A | 12/2005 |
| JP | 2010-179204 A | 8/2010 |
| JP | 2013-220402 A | 10/2013 |

* cited by examiner

EXHAUST GAS PURIFICATION CATALYST DEVICE AND EXHAUST GAS PURIFICATION METHOD

TECHNICAL FIELD

The present disclosure relates to an exhaust gas purification catalyst device and an exhaust gas purification method.

BACKGROUND ART

It is known that when a combustion mode of an engine is switched, a composition of an exhaust gas changes. Patent Document 1, for example, describes that an exhaust gas in a spark ignition (SI) combustion mode contains a large amount of unsaturated hydrocarbon such as olefin but in a homogeneous charge compression ignition (HCCI) combustion mode, the amount of saturated hydrocarbon (pentanes) and CO contained in the exhaust gas increases.

Patent Document 1 describes that in a case where a Pt/Rh mass ratio of a catalyst closely coupled to an exhaust manifold of an engine is increased to 4 to 10 times as high as that of a catalyst under the floor, even when the combustion mode is switched to a homogeneous charge compression ignition combustion mode, saturated hydrocarbon and CO can be efficiently purified. This close-coupled catalyst includes catalyst layers of an upper layer and a lower layer formed on a cell wall of a honeycomb substrate, the upper layer contains a Pt catalyst and a Rh catalyst, and the lower layer contains a Pt catalyst and a Pd catalyst. The Pt catalyst of the upper layer is a Pt-loaded La alumina composite oxide, and the Rh catalyst is a combination of a Rh-loaded CeZrNd composite oxide and a Rh-loaded LaZr/La alumina composite oxide. The Pt catalyst of the lower layer is a Pt-loaded La alumina composite oxide, and the Pd catalyst is a combination of a Pd-loaded CeZrNd composite oxide and a Pd-loaded La alumina composite oxide.

CITATION LIST

Patent Document

PATENT DOCUMENT 1: Japanese Unexamined Patent Publication No. 2013-220402

SUMMARY OF THE INVENTION

Technical Problem

Through researches so far, inventors of the present disclosure found that a Pd catalyst is effective for purification of unsaturated hydrocarbon discharged in spark ignition combustion (hereinafter referred to as "SI combustion") and a Pt catalyst is effective for purification of saturated hydrocarbon discharged in homogeneous charge compression ignition combustion (hereinafter referred to as "HCCI combustion"). However, as described in Patent Document 1, in a case where Pt, Pd, and Rh are contained as catalytic metals in one close-coupled catalyst, expected purification performance cannot be always obtained. This is supposed to be because the presence of multiple catalytic metals in one close-coupled catalyst hinders adsorption of saturated hydrocarbon and unsaturated hydrocarbon in active sites effective for purifications thereof and also because saturated hydrocarbon and unsaturated hydrocarbon scramble for the active sites.

These phenomena are, for example, that saturated hydrocarbon is not adsorbed in active sites (Pt) effective for purification thereof but is adsorbed in other active sites (e.g., Pd and Rh) and the purification does not efficiently proceed, and that a loss of the active sites (Pt) effective for the purification replaced by saturated hydrocarbon causes saturated hydrocarbon to be easily adsorbed in other active sites (e.g., Pd and Rh) and the purification does not efficiently proceed.

In particular, since a close-coupled catalyst disposed close to an engine is required to have efficient purification of an exhaust gas even at low temperatures, inefficient use of active sites as described above is disadvantageous for enhancing activation of the catalyst at low temperatures.

In view of the problems described above, the present disclosure has an object of efficiently purifying saturated hydrocarbon and unsaturated hydrocarbon from the time when the temperature of an exhaust gas is low.

Solution to the Problem

To solve the problems described above, according to the present disclosure, a Pt catalyst containing neither Pd nor Rh is provided in addition to a first catalyst containing a Pd catalyst and a Rh catalyst.

An exhaust gas purification catalyst device disclosed herein is used for purifying saturated hydrocarbon and unsaturated hydrocarbon included in an exhaust gas from an engine, and includes: a first catalyst including a Pd-containing catalyst layer and a Rh-containing catalyst layer; and a second catalyst containing Pt-loaded alumina and containing neither Rh nor Pd, wherein the first catalyst or the second catalyst are disposed in one place in such a manner that one of the first catalyst or the second catalyst is located upstream of the other in a flow direction of the exhaust gas.

In the catalyst device, the Pd-containing catalyst layer of the first catalyst and Pt-loaded alumina of the second catalyst act for oxidation purification of hydrocarbon (HC) and CO in the exhaust gas, and the Rh-containing catalyst layer of the first catalyst acts for reduction purification of nitrogen oxide (NOx) in the exhaust gas. Pd in the first catalyst is effective especially for oxidation purification of unsaturated HC, and Pt of the second catalyst is effective especially for oxidation purification of saturated HC. Unsaturated HC and saturated HC can be efficiently purified from the time when the temperature of the exhaust gas is low.

As described above, since the second catalyst contains neither Pd nor Rh, the second catalyst efficiently acts for oxidation purification of saturated HC. Specifically, even when the amount of saturated HC in the exhaust gas increases (e.g., in HCCI combustion) and saturated HC and unsaturated HC scramble for active sites in the second catalyst, since the second catalyst contains neither Pd nor Rh, saturated HC is adsorbed in active sites of Pt-loaded alumina. In other words, since adsorption of saturated HC in active sites of Pt-loaded alumina is not inhibited by Pd and Rh, oxidation purification thereof can efficiently proceed.

In addition, since the first catalyst and the second catalyst are disposed in one place, heat of reaction of upstream one of the catalysts is easily transmitted to the other downstream catalyst, which are advantageous for early activation of the downstream catalyst.

The first catalyst may not contain Pt. In this case, even when the amount of unsaturated HC in the exhaust gas increases (e.g., in SI combustion) and unsaturated HC and saturated HC scramble for active sites in the first catalyst, since the first catalyst does not contain Pt, unsaturated HC is adsorbed in active sites of the Pd-containing catalyst layer effective for purification of unsaturated HC. Consequently, oxidation purification thereof can efficiently proceed. That is, it is possible to avoid a phenomenon in which unsaturated hydrocarbon is not adsorbed in active sites (Pd) effective for purification thereof but is adsorbed in other active sites (Pt) and, thereby, purification thereof does not efficiently proceed.

In a case where the combustion mode of the engine is switched between SI combustion and HCCI combustion, it is advantageous for obtaining combustion stability to start the engine in the SI combustion mode. In this case, the exhaust gas generated in starting the engine has a low temperature and has a gas composition including a large amount of unsaturated HC.

Thus, it is preferable to dispose the first catalyst upstream of the second catalyst in the flow direction of the exhaust gas. In this manner, in starting the engine, the temperature increases more rapidly in the upstream first catalyst effective for oxidation purification of unsaturated HC than in the second catalyst. Thus, unsaturated HC whose amount has increased in starting the engine can be efficiently purified by the Pd-containing catalyst layer of the first catalyst, and purification efficiency of unsaturated HC can be enhanced.

In a preferred embodiment, the first catalyst shows activity to purification of the unsaturated HC at a temperature lower than the second catalyst, and the second catalyst shows activity to purification of the saturated HC at a temperature lower than the first catalyst.

In a more preferred embodiment, the first catalyst includes a honeycomb substrate supporting the Pd-containing catalyst layer and the Rh-containing catalyst layer, the second catalyst includes a honeycomb substrate supporting the Pt-loaded alumina, and the honeycomb substrate of the second catalyst has a thermal capacity smaller than a thermal capacity of the honeycomb substrate of the first catalyst.

With this configuration, the temperature of the second catalyst readily increases by heat of the exhaust gas, the second catalyst can be activated in an early period, which is advantageous for purification of saturated HC. In particular, in the case where the second catalyst is disposed downstream of the first catalyst in the flow direction of the exhaust gas, the temperature of the second catalyst increases more slowly than the first catalyst in starting the engine. However, the use of the honeycomb substrate having a small thermal capacity can accelerate the temperature increase of the second catalyst.

The Pd-containing catalyst layer of the first catalyst preferably contains Pd-loaded alumina and a Pd-loaded CeZr-based composite oxide. With this configuration, Pd is loaded on alumina particles having a large specific surface area and a high thermal resistance. Thus, even when the layer is exposed to a high-temperature exhaust gas, activation at low temperature concerning purification of HC and CO does not significantly degrade. In addition, Pd loaded on CeZr composite oxide particles are controlled to be in a well-oxidized state by active oxygen supplied from the CeZr composite oxide particles, which is advantageous for oxidation purification of HC and CO.

Preferably, the first catalyst and the second catalyst are disposed in series and housed in one container. In this configuration, heat of reaction generated in the upstream catalyst can be easily transmitted to the downstream catalyst, which is advantageous for early activation of the downstream catalyst.

The first catalyst may be a catalyst including the Pd-containing catalyst layer and the Rh-containing catalyst layer and containing Pt. With this configuration, not only the second catalyst but also the first catalyst can purify saturated hydrocarbon by using Pt included in the second catalyst and the first catalyst.

Preferably, a heating unit configured to heat the exhaust gas when the exhaust gas flows into the first catalyst is disposed upstream of the first catalyst in the flow direction of the exhaust gas. This configuration can enhance NOx purification efficiency in switching from HCCI combustion to SI combustion.

This phenomenon will be specifically described. When the mode is switched from HCCI combustion to SI combustion, the combustion temperature increases, resulting in an increase in the amount of exhaust NOx from the engine. Rh of the Rh-containing catalyst layer of the first catalyst is effective as a NOx purification catalyst. However, in switching from HCCI combustion to SI combustion, this Rh shows low activation concerning NOx purification. Specifically, in HCCI combustion in which the air-fuel ratio is 20 or more, that is, in a lean condition, since the oxygen concentration of the exhaust gas is high, Rh of the first catalyst is in an oxidation state. In addition, since the exhaust gas temperature is low in HCCI combustion, the temperature of the first catalyst is also low. Thus, even when HCCI combustion is switched to SI combustion, Rh of the first catalyst does not effectively functions as a NOx reduction catalyst immediately.

On the other hand, when the heating unit is operated in switching from HCCI combustion to SI combustion, the exhaust gas temperature increases, resulting in an increase in the temperature of the first catalyst. In this manner, oxidation reaction of HC and CO proceeds in the first catalyst and, accordingly, Rh comes to be in a reduced state. As described above, the temperature of the first catalyst increases so that Rh is in a reduced state. As a result, Rh shows high activation concerning NOx purification, and thus, NOx purification in switching to SI combustion can efficiently proceed.

A exhaust gas purification method disclosed herein is a method for purifying saturated hydrocarbon and unsaturated hydrocarbon included in an exhaust gas from an engine, a first catalyst including a Pd-containing catalyst layer and a Rh-containing catalyst layer and a second catalyst containing Pt-loaded alumina and containing neither Rh nor Pd are used, the first catalyst or the second catalyst are disposed in one place in such a manner that one of the first catalyst or the second catalyst is located upstream of the other catalyst in a flow direction of the exhaust gas, and the saturated hydrocarbon is purified mainly by the second catalyst and the unsaturated hydrocarbon is purified mainly by the first catalyst.

With this exhaust gas purification method, the Pd-containing catalyst layer of the first catalyst and Pt-loaded alumina of the second catalyst act for oxidation purification of HC and CO in the exhaust gas, and the Rh-containing catalyst layer acts for reduction purification of NOx in the exhaust gas. Pd of the first catalyst is especially effective for oxidation purification of unsaturated HC, and Pt of the second catalyst is especially effective for oxidation purification of saturated HC. Thus, unsaturated HC and saturated HC can be efficiently purified from the time when the temperature of the exhaust gas is low. In this manner, since the second catalyst contains neither Pd nor Rh, oxidation purification of saturated HC can be performed without inhibition by Pd and Rh.

Since the first catalyst and the second catalyst are disposed in one place, heat of reaction of the upstream one of the catalysts is easily transmitted to the other, which is advantageous for early activation of the downstream catalyst.

In the exhaust gas purification method, the engine is preferably operated with selective switching between an SI combustion mode and an HCCI combustion mode in accordance with an operating range of the engine.

In the exhaust gas purification method, unsaturated HC, which is discharged in a large amount from the engine in SI combustion, can be efficiently purified by oxidation with the first catalyst, and saturated HC, which is discharged in a large amount from the engine in HCCI combustion, can be efficiently purified by oxidation with the second catalyst.

In the exhaust gas purification method, the first catalyst is preferably disposed upstream of the second catalyst in the flow direction of the exhaust gas, and the engine is started in the SI combustion mode. In starting the engine, the temperature increases more rapidly in the upstream first catalyst effective for oxidation purification of unsaturated HC than in the second catalyst. Thus, unsaturated HC, which is discharged in large amount in starting the engine can be efficiently purified by the Pd-containing catalyst layer of the first catalyst, and purification efficiency of unsaturated HC can be enhanced.

Preferably, a heating unit configured to heat an exhaust gas flowing into the first catalyst is disposed upstream of the first catalyst in the flow direction of the exhaust gas, and the heating unit is operated in switching the engine from the HCCI combustion mode to the SI combustion mode. In this manner, purification efficiency of NOx in switching from HCCI combustion to SI combustion can be enhanced.

Advantages of the Invention

According to the present disclosure, the first catalyst and the second catalyst are disposed in one place in such a manner that one of the first catalyst or the second catalyst is located upstream of the other. The first catalyst includes the Pd-containing catalyst layer and the Rh-containing catalyst layer. The second catalyst contains Pt-loaded alumina and containing neither Rh nor Pd. Thus, unsaturated HC and saturated HC can be efficiently purified from the time when the temperature of the exhaust gas is low.

DESCRIPTION OF EMBODIMENTS

An embodiment of the present disclosure will be described hereinafter with reference to the drawings. Note that the following description of the preferred embodiment is merely illustrative in nature, and is not intended to limit the scope, applications, and use of the present disclosure.
<Engine>

Figure 1:
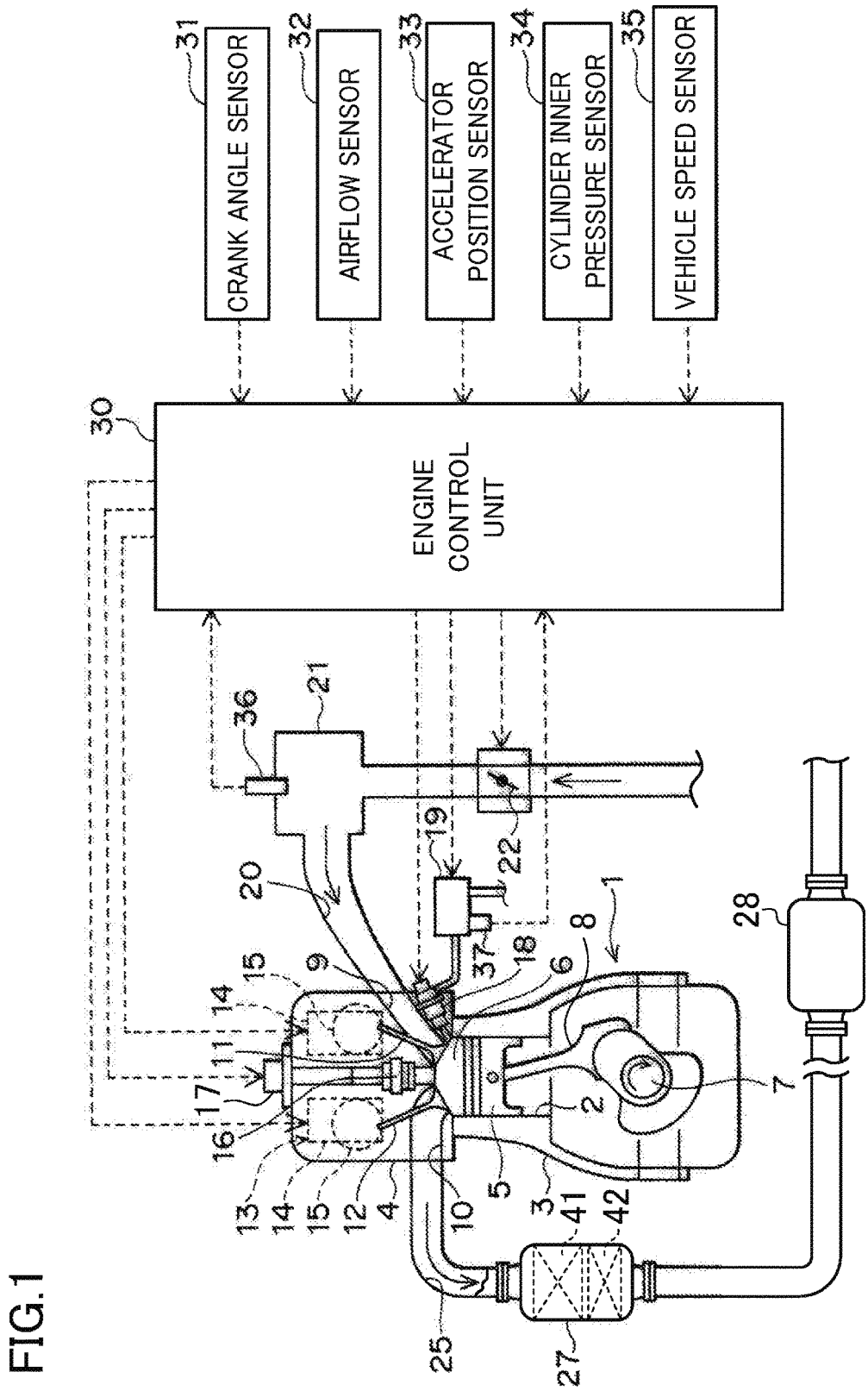
FIG. 1 is an outline view illustrating an engine system configuration according to an embodiment of the present disclosure.

An engine 1 according to the embodiment illustrated in FIG. 1 is a multi-cylinder gasoline engine having a combustion mode switchable between HCCI combustion and SI combustion in accordance with an operating state of the engine, and is mounted in an automobile. In FIG. 1, reference character 3 denotes a cylinder block including a plurality of cylinders 2, reference character 4 denotes a cylinder head, and reference character 5 denotes a piston provided in each of the cylinders 2. A combustion chamber 6 is formed between the upper surface of the piston 5 and the lower surface of the cylinder head 4. The piston 5 is connected to a crankshaft 7 by a connecting rod 8.

The cylinder head 4 includes an intake port 9 and an exhaust port 10 for each of the cylinders 2. The intake port 9 and the exhaust port 10 include an intake valve 11 and an exhaust valve 12, respectively. Each of the intake valve 11 and the exhaust valve 12 is driven by a valve mechanism 13 in synchronization with rotation of the crankshaft 7.

The valve mechanism 13 for each of the intake valve 11 and the exhaust valve 12 incorporates a variable valve lift mechanism (hereinafter referred to as a "VVL") 14 and a variable valve timing mechanism (hereinafter referred to as "VVT") 15. Each of the VVL 14 and the VVT 15 operates based on an instruction from an engine control unit 30. The VVLs 14 change lift amounts (amounts of valve opening) of the intake valve 11 and the exhaust valve 12. The VVTs 15 change open/close timings (phase angles) of the intake valve 11 and the exhaust valve 12. The VVLs 14 and the VVTs 15 change lift characteristics of the intake valve 11 and the exhaust valve 12 in accordance with the engine operating state. Accordingly, the amount of intake air of the cylinders 2 and the amount of remaining burnt gas (internal EGR) in the cylinders 2 change. The VVLs 14 and the VVTs 15 are generally employed mechanisms and are known to those skilled in the art. Thus, detailed description thereof is omitted.

The cylinder head 4 includes an ignition plug 16 facing the combustion chamber 6 for each of the cylinders 2. The ignition plug 16 performs discharge (spark ignition) at a predetermined timing in response to a power supply from an ignition circuit 17. The cylinder head 4 includes a fuel injection valve 18 facing a side of the combustion chamber 6 at an intake side for each of the cylinders 2. The fuel injection valve 18 receives fuel from a fuel tank through a fuel passage by a high-pressure fuel pump 19. The high-pressure fuel pump 19 freely changes a fuel supply pressure, that is, a fuel pressure, to the fuel injection valve 18, in a wide range from a low pressure to a high pressure. The fuel injection valve 18 directly injects fuel to the combustion chamber 6 at a predetermined injection timing (e.g., an intake stroke), and generates an air-fuel mixture at a predetermined air-fuel ratio in the combustion chamber 6.

A surge tank 21 is provided at a location of an intake passage 20 of the engine 1. An electronically controlled throttle valve 22 is disposed at a location of the intake passage 20 upstream of the surge tank 21. The intake passage 20 branches off in portions corresponding to the cylinders 2 at a location downstream of the surge tank 21, and the downstream ends of the branched intake passage 20 are connected to the intake ports 9 of the cylinders 2.

An exhaust gas passage 25 of the engine 1 branches off at the upstream end thereof, and the branched upstream ends of the exhaust gas passage 25 are connected to the exhaust ports 10 of the cylinders 2. A exhaust gas purification catalyst device 27 is disposed in an upstream portion of the exhaust gas passage 25, and an exhaust gas purification catalyst device 28 is disposed in the exhaust gas passage 25 at a location downstream of the catalyst device 27. In this embodiment, the upstream end of the upstream catalyst device 27 is directly connected to the branched downstream end of an exhaust manifold and is disposed in an engine room of the automobile. The downstream catalyst device 28 is disposed under the floor of the automobile.

The engine control unit 30 includes a central processing unit (CPU) and a computer including memories. Based on information detected by sensors, the control unit 30 controls operations of, for example, the VVLs 14, the VVTs 15, the ignition circuit 17, the fuel injection valve 18, the high-pressure fuel pump 19, and the throttle valve 22 in accordance with the operating state of the engine 1.

The sensors include a crank angle sensor 31 for detecting a rotation angle (crank angle) of the crankshaft 7, an airflow sensor 32 for detecting a flow rate of air supplied to the engine 1, an accelerator position sensor 33 for detecting an accelerator position (accelerator pedal operation amount), a cylinder inner pressure sensor 34 for detecting a cylinder inner pressure (pressure in the combustion chamber 6) of each of the cylinders 2, a vehicle speed sensor 35 for detecting the speed of the automobile, an intake-air temperature sensor 36 for detecting an intake air temperature (temperature of air in the surge tank 21), and a fuel pressure sensor 37 for detecting a pressure of fuel supplied from the high-pressure fuel pump 19 to the fuel injection valve 18.

These sensors 31 to 37 are electrically connected to the control unit 30. The cylinder inner pressure sensor 34 is integrated with the ignition plug 16, and incorporated in the ignition plug 16. The cylinder inner pressure sensor 34 may be integrated with the fuel injection valve 18.

Based on the control information, the control unit 30 switches the combustion mode of the engine operation between an HCCI combustion mode in which an air-fuel mixture generated in an intake stroke is self-ignited by compression near a compression top dead center without using the ignition plug 16 so that combustion occurs and an SI combustion mode in which an air-fuel mixture is forcedly ignited by spark ignition using the ignition plug 16 so that combustion occurs.

Figure 2:
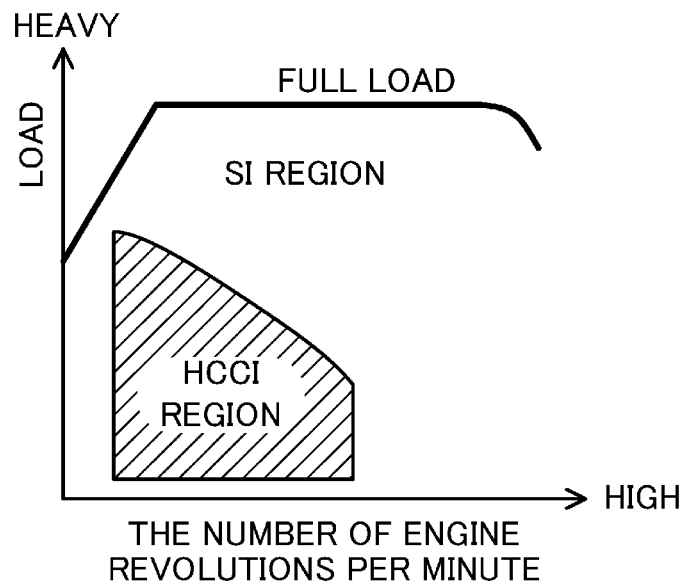
FIG. 2 illustrates an example of a combustion mode map of an engine.

As illustrated in a combustion mode map of FIG. 2, in this embodiment, an engine operating range with a predetermined low-speed rotation and a low load is defined as an HCCI range, and an engine operating range with a high-speed rotation and a heavy load exceeding those of the HCCI range is defined as an SI range. The engine starts in the SI combustion mode. The combustion mode map is set by previously empirically obtaining an optimum combustion mode for the engine rotation speed and the engine load, and is electrically stored in a memory of the control unit 30.

The memory of the control unit 30 electrically stores a target torque map in which an optimum value of a target torque (engine load) empirically determined in accordance with changes in an accelerator position and an engine rotation speed is recorded, and a fuel injection amount map in which an optimum fuel injection amount Qm empirically determined in accordance with changes in the target torque, an intake air amount, and the number of revolutions per minute is electrically stored. In the target torque map, as the accelerator position increases or the engine rotation speed increases, the target torque increases.

In an operation in the HCCI combustion mode, a valve-open period of the exhaust valve 12 and a valve-open period of the intake valve 11 are set to have a negative valve overlap period (NVO period) in which the valves 11 and 12 are both closed near an exhaust top dead center (a top dead center between an exhaust stroke and an intake stroke). Then, after the NVO period terminates after the exhaust top dead center and then the intake valve 11 is opened, fuel is injected by the fuel injection valve 18. This injected fuel forms an air-fuel mixture in the combustion chamber 6, and the air-fuel mixture is self-ignited by compression by itself near the compression top dead center (i.e., without using other ignition units or firing units).

In an operation in the SI combustion mode, in each cylinder cycle, the valve-open period of the exhaust valve 12 and the valve-open period of the intake valve 11 are set to slightly overlap each other near an exhaust top dead center. After the intake valve 11 is opened, normal fuel injection is performed only once by the fuel injection valve 18. Thereafter, an air-fuel mixture is ignited by the ignition plug 16 near a compression top dead center (a top dead center between a compression stroke and an expansion stroke), and fuel combustion occurs by flame propagation.

In the HCCI combustion mode, combustion of the air-fuel mixture (fuel) rapidly proceeds without flame propagation. In this case, since the combustion temperature is lower than that of spark ignition, the amount of NOx generation can be significantly reduced. Through researches, the inventors of the present disclosure found that large amounts of saturated HC (n-pentane or iso-pentane) with carbon number 5 and CO were exhausted in this HCCI combustion mode. That is, in an exhaust gas in the SI combustion mode, the amounts of n-pentane and iso-pentane were about 100 to 200 ppmC in total. On the other hand, in an exhaust gas in the HCCI combustion mode, a total of 1000 to 3000 ppmC of n-pentane and iso-pentane was exhausted, and the concentration thereof was higher than that in the SI combustion mode by one digit. In addition, the CO concentration of the exhaust gas in the HCCI combustion mode was about 2000 to 4000 ppm.

<Exhaust Gas Purification Catalyst Device 27>

The exhaust gas purification catalyst device 27 efficiently purifies an exhaust gas discharged from the engine 1 by SI combustion and containing a large amount of unsaturated HC and an exhaust gas discharged from the engine 1 by HCCI combustion and containing a large amount of saturated HC, and includes a first catalyst 41 and a second catalyst 42 that are disposed in one place and used for purification of unsaturated HC and saturated HC. In this embodiment, the first catalyst 41 and the second catalyst 42 are disposed in series in one catalyst container. The first catalyst 41 is disposed upstream of the second catalyst 42 in a flow direction of the exhaust gas. A honeycomb substrate of the second catalyst 42 has a thermal capacity smaller than a thermal capacity of a honeycomb substrate of the first catalyst 41.

[First Catalyst]

Figure 3:
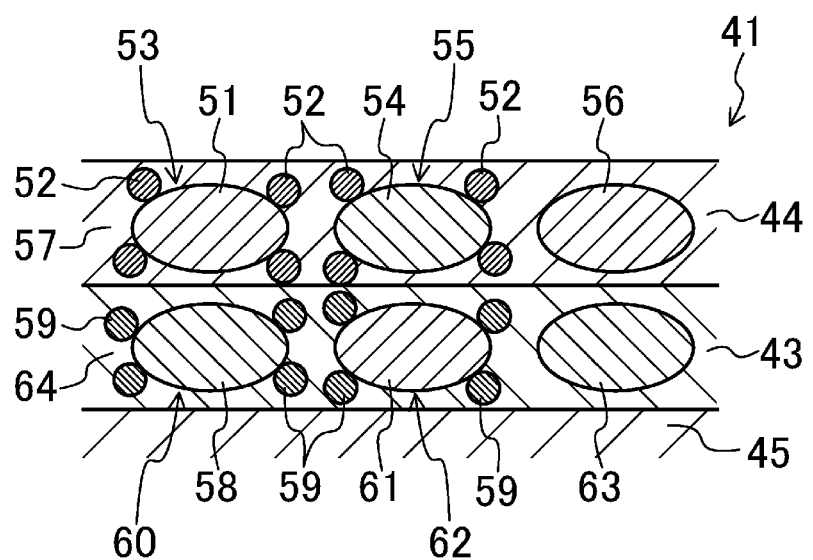
FIG. 3 is a cross-sectional view schematically illustrating a configuration of a first catalyst.

As schematically illustrated in FIG. 3, the upstream first catalyst 41 includes a Pd-containing catalyst layer 43 and a Rh-containing catalyst layer 44. The Pd-containing catalyst layer 43 is formed on an exhaust gas passage wall of a honeycomb substrate 45. The Rh-containing catalyst layer 44 is stacked on the Pd-containing catalyst layer 43. None of the catalyst layers 43 and 44 contains Pt.

The Rh-containing catalyst layer 44 contains a Rh-loaded CeZr-based composite oxide 53 in which Rh52 is loaded on a CeZr-based composite oxide 51, a Rh-loaded Zr-based composite oxide 55 in which Rh52 is loaded on a Zr-based composite oxide 54 containing no Ce, activated alumina 56, and a binder 57. The binder 57 of this embodiment is a Rh-doped CeZr-based composite oxide. The Rh-loaded CeZr-based composite oxide 53 and the Rh-doped CeZr-based composite oxide binder 57 have been subjected to a reduction treatment. Rh may be loaded on activated alumina instead of being loaded on the Zr-based composite oxide.

The Pd-containing catalyst layer 43 contains a Pd-loaded alumina 60 on which Pd 59 is loaded on activated alumina 58, a Pd-loaded CeZr-based composite oxide 62 on which the Pd 59 is loaded on a CeZr-based composite oxide 61, a CeZr-based composite oxide 63, and a binder 64. The binder 64 of this embodiment is an yttria-doped zirconia binder.

The CeZr-based composite oxide and the Ce-free Zr-based composite oxide are oxides (reactive oxygen release materials) that take oxygen from an exhaust gas and release the oxygen as reactive oxygen. In the case of the CeZr-based composite oxide, a reaction with a valence change of Ce reversibly proceeds so that oxygen in an exhaust gas is stored and released as reactive oxygen. The Ce-free Zr-based composite oxide, which shows a high ion conduction, takes ambient oxygen therein by an oxygen exchange reaction and releases active oxygen.

It is known that Pd is more readily degraded by heat than Rh, and causes sulfur poisoning and phosphorus poisoning. In this embodiment, since the Pd-containing catalyst layer 43 is disposed at a lower position, the upper Rh-containing catalyst layer 44 can suppress degradation by heat and poisoning of Pd. It is also known that Rh forms an alloy with Pd to be degraded. In this embodiment, these catalytic metals are disposed in different catalyst layers, and thus, alloying of these catalytic metals can be reduced.

[Preparation of First Catalyst]

The substrate 45 is immersed in slurry obtained by mixing a catalytic material and a binder material constituting the Pd-containing catalyst layer 43 with ion-exchanged water, and then the substrate 45 is taken out of the slurry. Redundant slurry attached to the substrate 45 is removed by air blowing. Thereafter, drying (at 150° C.) and calcination (held for two hours at 500° C.) of the slurry attached to the substrate 45 are performed in the air. In this manner, the Pd-containing catalyst layer 43 is formed on the exhaust gas passage wall of the substrate 45.

Then, a reduction treatment is performed on a Rh-loaded Zr-based composite oxide material in catalytic materials constituting the Rh-containing catalyst layer 44 and a Rh-doped CeZr-based composite oxide material to be the binder 57. The reduction treatment is performed in a reduction atmosphere containing CO by heat treatment to a temperature range greater than or equal to 500° C. and less than or equal to 800° C. After the reduction treatment, the Rh-doped CeZr-based composite oxide material is wet ground to have a median diameter of, for example, 300 nm or less, and preferably 200 nm or less. In this manner, a sol in which fine powder of Rh-doped $CeZrNdYO_x$ is dispersed in a solvent, that is, a binder material, is obtained.

Subsequently, the substrate 45 including the Pd-containing catalyst layer 43 is immersed in slurry obtained by mixing all the catalytic materials constituting the Rh-containing catalyst layer 4 and the binder material with ion-exchanged water, and then the substrate 45 is taken out of the slurry. Redundant slurry attached to the Pd-containing catalyst layer 43 is removed by air blowing, and then drying (at 150° C.) and calcination (held for two hours at 500° C.) of the slurry are performed in the air. In this manner, the Rh-containing catalyst layer 44 is formed on the surface of the Pd-containing catalyst layer 43.

[Second Catalyst and Preparation Thereof]

Figure 4:
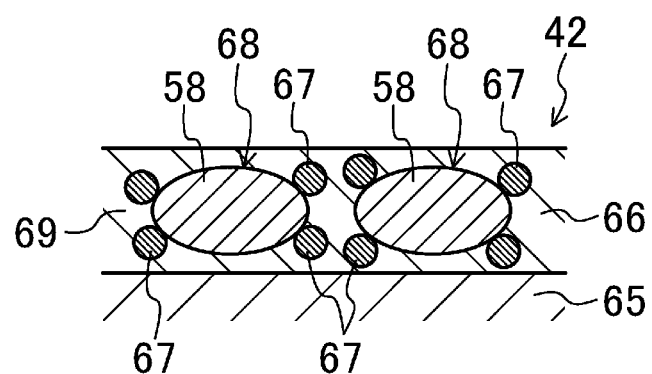
FIG. 4 is a cross-sectional views schematically illustrating a configuration of a second catalyst.

As schematically illustrated in FIG. 4, the downstream second catalyst 42 is obtained by forming a Pt-containing catalyst layer (single layer) 66 on an exhaust gas passage wall of a honeycomb substrate 65. The Pt-containing catalyst layer 66 contains Pt-loaded alumina 68 in which Pt 67 is loaded on activated alumina 58 and a binder 69. The binder 69 of this embodiment is an yttria-doped zirconia binder.

The second catalyst 42 is prepared in the following manner. The substrate 65 is immersed in slurry obtained by mixing a Pt-loaded alumina material and a binder material with ion-exchanged water, and then the substrate 65 is taken out. Then, redundant slurry attached to the substrate 65 is removed by air blowing, and drying (at 150° C.) and calcination (held for two hours at 500° C.) of the slurry are performed in the air. In this manner, the Pt-containing catalyst layer 66 is formed on the exhaust gas passage wall of the substrate 65.

[Preparation Method of Catalytic Materials]

—Pd-loaded CeZr-based Composite Oxide 62—

The preparation method will be described using, as an example, a case where a CeZrNdLaY composite oxide as a CeZr-based composite oxide.

The CeZrNdLaY composite oxide can be prepared by coprecipitation. First, an eight-fold dilution of 28%, by mass, of ammonia water is mixed in a nitrate solution as a mixture of cerium nitrate hexahydrate, a zirconium oxynitrate solution, neodymium nitrate hexahydrate, lanthanum nitrate, yttrium nitrate, and ion-exchanged water, and the mixture is neutralized, thereby obtaining a coprecipitate. A solution containing this coprecipitate is placed in a centrifugal separator for centrifugation so that supernatant liquid is removed (dewatering), and then ion-exchanged water is added to the resulting solution (washing). This process is performed a necessary number of times. Thereafter, the coprecipitate is dried in the air at 150° C. for 24 hours, is ground, and then is calcined in the air at 500° C. for two hours. In this manner, powder of the CeZrNdLaY composite oxide is obtained. The CeZrNdLaYO composite oxide powder is loaded with Pd by evaporation to dryness using a palladium nitrate aqueous solution. In this manner, a Pd-loaded CeZr-based composite oxide is obtained.

—Pd-loaded Alumina 60—

The Pd-loaded alumina 60 can be obtained by loading Pd on active alumina powder by evaporation to dryness using a palladium nitrate aqueous solution.

—CeZr-based Composite Oxide (Reactive Oxygen Release Material) 63—

The CeZr-based composite oxide (reactive oxygen release material) 63 can also be obtained by the coprecipitation described above.

—Rh-loaded CeZr-based Composite Oxide 53—

The Rh-loaded CeZr-based composite oxide 53 can be obtained by loading Rh on the CeZr-based composite oxide powder obtained by the coprecipitation by evaporation to dryness. As a Rh source, a rhodium nitrate aqueous solution can be used.

—Rh-loaded Zr-based Composite Oxide 55—

The preparation method will be described using, as an example, a case where a ZrLaY composite oxide as a Ce-free Zr-based composite oxide.

The ZrLaY composite oxide can also be prepared by coprecipitation. First, an eight-fold dilution of 28%, by mass, of ammonia water is mixed in a nitrate solution as a mixture of a zirconium oxynitrate solution, lanthanum nitrate, yttrium nitrate, and ion-exchanged water, and the mixture is neutralized, thereby obtaining a coprecipitate. In a manner similar to that described above, a solution containing this coprecipitate is dewatered and washed, and then dried and calcined. In this manner, ZrLaY composite oxide powder can be obtained. The ZrLaY composite oxide powder is loaded with Rh by evaporation to dryness, and then is subjected to a heat treatment in a CO atmosphere. In this manner, a Rh-loaded Zr-based composite oxide can be obtained.

—Rh-doped CeZr-based Composite Oxide Binder 57—

The binder 57 can be prepared by coprecipitation. The preparation method will be described using, as an example, a case where the CeZr-based composite oxide is a CeZrNdY composite oxide.

An eight-fold dilution of 28%, by mass, of ammonia water is mixed in a nitrate solution as a mixture of cerium nitrate hexahydrate, a zirconium oxynitrate solution, neodymium nitrate hexahydrate, yttrium nitrate, rhodium nitrate, and ion-exchanged water, and the mixture is neutralized, thereby obtaining a coprecipitate. In a manner similar to that described above, a solution containing this coprecipitate is dewatered and washed, and then dried and calcined. In this manner, Rh-doped CeZrNdY composite oxide powder can be obtained.

The obtained powder is subjected to heat treatment in a CO atmosphere. Thereafter, ion-exchanged water is added to the powder to form slurry (having a solid content of 25% by mass), and the slurry is placed in a ball grinder and ground with 0.5-mm zirconia beads for about three hours. In this manner, a sol in which powder of Rh-doped CeZrNdYO$_x$ having a reduced particle size small enough to be used as a binder material is dispersed in a solvent is obtained. Through this process, the particle size of the powder of Rh-doped CeZrNdYO$_x$ can be reduced to 200 nm or less in terms of median diameter. In the ground powder of Rh-doped CeZrNdLaYOx having such a reduced particle size, Rh dissolved in the powder is exposed in a larger surface area than in unground Rh-doped CeZrNdLaYOx powder. In addition, the surface area of the Rh-doped CeZrNdLaYOx powder is increased by grinding, and thus, the Rh-doped CeZrNdLaYOx powder has a significantly enhanced catalyst performance though the Rh-doped CeZrNdLaYOx powder is a binder material.

[Reduction Treatment of Rh-doped CeZr-based Composite Oxide Material]

A reduction treatment of a Rh-doped CeZr-based composite oxide material serving as a binder will be described. The reduction treatment of this embodiment is a CO reduction treatment in which heat treatment is performed on a material in a CO atmosphere.

To define reduction treatment conditions that can enhance catalyst effects, first, the state of Rh in a CeZr-based composite oxide depending on the presence of a reduction treatment was examined by X-ray photoelectron spectroscopy (XPS). This test will be described below.

A Rh-doped CeZrNd composite oxide as a Rh-doped CeZr-based composite oxide was prepared. The CeZrNd composite oxide had a composition of $CeO_2:ZrO_2:Nd_2O_3=23:67:10$ (mass ratio). The Rh-doped amount was 0.6% by mass.

Figure 5:
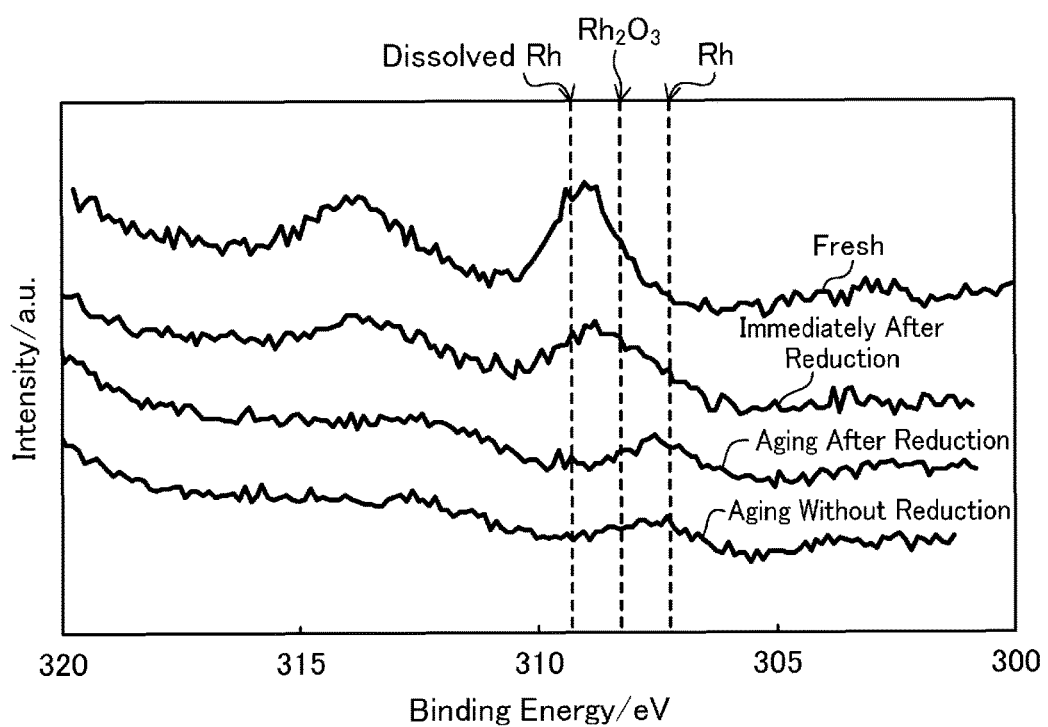
FIG. 5 is a graph of XPS spectra showing changes in properties of Rh in a case where a reduction treatment was performed on a Rh-doped CeZr-based composite oxide.

After preparation, four samples were provided so that XPS analysis was performed on one of the four samples (fresh) and a reduction treatment was performed on two of the samples. The reduction treatment is a process in which a sample was kept at 600° C. for 60 minutes in a 1%-CO atmosphere. Immediately after the reduction treatment, one of the two samples was subjected to XPS analysis (immediately after reduction). An aging treatment was performed on the other one of the two samples and a sample not subjected to the reduction treatment. The aging treatment is a process in which a sample was kept at 1000° C. for 24 hours in an atmospheric gas heat-treatment reactor (with 2% of O2, 10% of $H_2O$, and residue of $N_2$). FIG. 5 and Table 1 show results of the XPS analysis performed on the samples. In Table 1, the surface Rh concentration of a CeZrNd composite oxide was derived from a peak area in the graph of XPS.

TABLE 1

| | Surface Rh concentration (atomic %) | | |
|---|---|---|---|
| | Immediately after reduction treatment | Aging after reduction treatment | Aging without reduction treatment |
| Rh-doped material | 0.13 | 0.10 | 0.08 |

As shown in FIG. 5, the reduction treatment increases the peak of a metal Rh, and the metal Rh is precipitated on the surface of the CeZrNd composite oxide. Table 1 shows that aging after the reduction treatment increases the amount of the metal Rh in the surface of the CeZrNd composite oxide, as compared to a case where aging is performed without a reduction treatment.

From the results described above, the reduction treatment increases the amount of the metal Rh in the surface of the CeZrNd composite oxide, which is advantageous in enhancing exhaust gas purification performance.

Figure 6A:
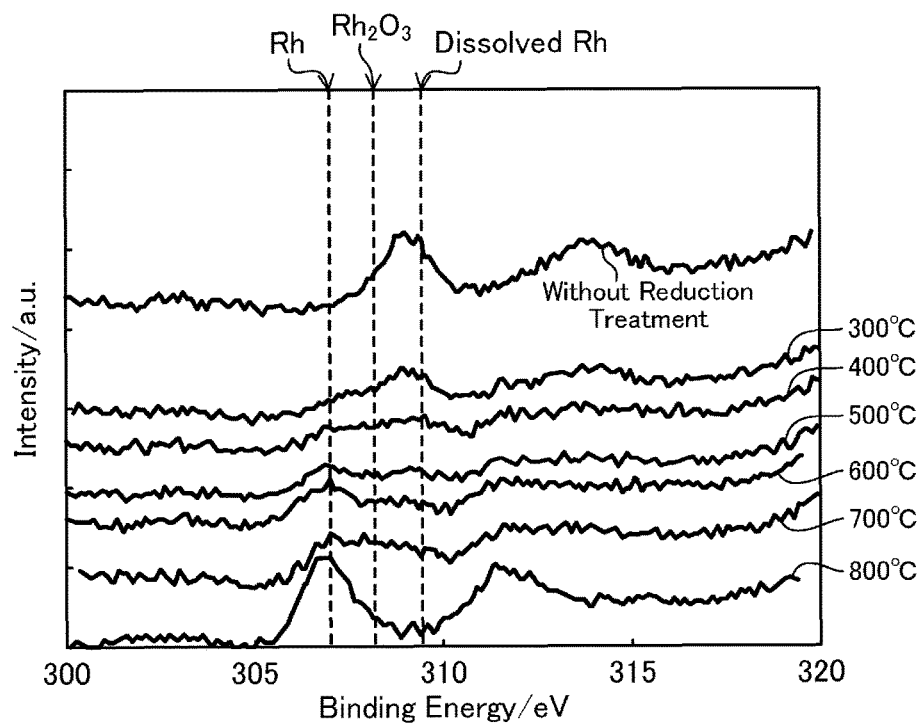
FIG. 6A is a graph of XPS spectra showing a change in properties of Rh in a case where a reduction treatment was performed on a Rh-doped CeZr-based composite oxide with different treatment temperatures.
Figure 6B:
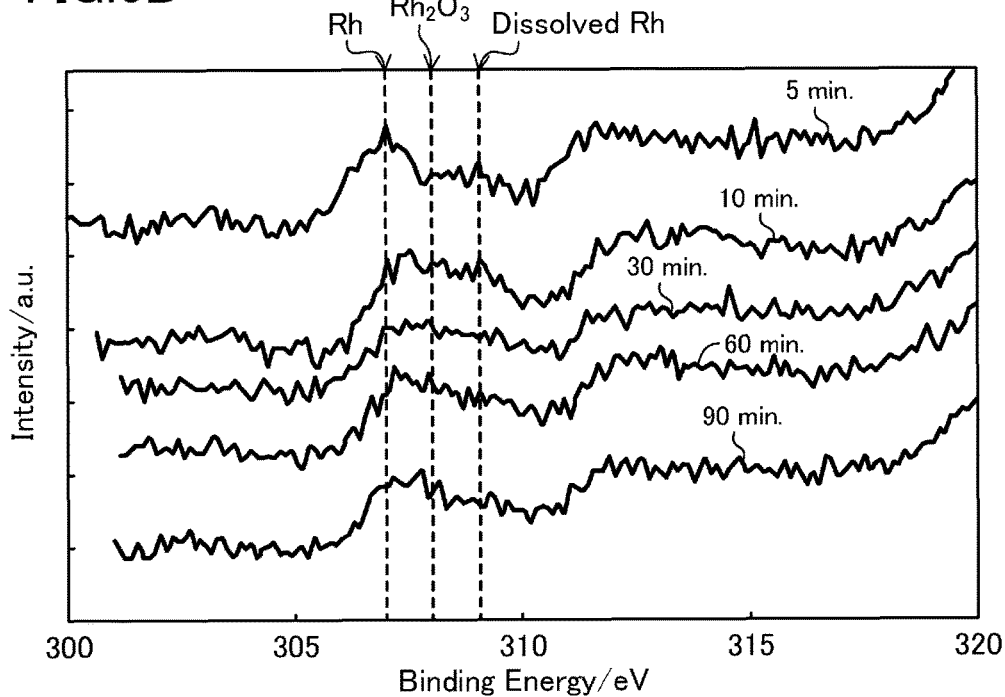
FIG. 6B is a graph of XPS spectra showing changes in properties of Rh in a case where a reduction treatment was performed on a Rh-doped CeZr-based composite oxide with different treatment times.

Next, to examine an optimum temperature and an optimum time of heat treatment in the reduction treatment, the reduction treatment was performed on the Rh-doped CeZrNd composite oxide with various temperatures of heat treatment, and XPS analysis results thereof were compared with one another. In this comparison, six heat treatment temperatures of 300° C., 400° C., 500° C., 600° C., 700° C., and 800° C. were used. The heat treatment time was 10 minutes in each case. FIG. 6($a$) shows the results together with analysis results of a Rh-doped CeZrNd composite oxide not subjected to the reduction treatment.

As shown in FIG. 6($a$), in the cases where the heat treatment temperature in the reduction treatment was 300° C. and 400° C., a large amount of dissolved Rh was observed, whereas between heat treatment temperatures of 500° C. and 800° C., dissolved Rh and $Rh_2O_3$ were reduced and a peak of the metal Rh was observed. That is, it is suggested that the heat treatment temperature in the reduction treatment is preferably greater than or equal to 500° C. and less than or equal to 800° C.

To examine a heat treatment time necessary for the reduction treatment, an examination was performed with a variation of time from 5 minutes to 90 minutes at a fixed temperature of 600° C. FIG. 6($b$) shows the results thereof. FIG. 6($b$) suggests that a peak of the metal Rh is observed even in five minutes at minimum, and thus, five minutes is sufficient at 600° C.

[Advantages of Reduction Treatment of Rh-doped CeZr-based Composite Oxide Material]

As the first catalyst 41, a first catalyst A obtained by performing a reduction treatment (at 600° C. in a 1%-CO atmosphere for five minutes) on a Rh-doped CeZrNdY composite oxide (binder), and a first catalyst B not subjected to the reduction treatment were prepared. Table 2 shows the catalyst compositions of the first catalysts A and B.

TABLE 2

| | First catalysts A to C | Mass ratio |
|---|---|---|
| Rh-containing catalyst layer (upper layer) | Rh-loaded CeZrNdLaY composite oxide $CeO_2:ZrO_2:Nd_2O_3:La_2O_3:Y_2O_3$ = 10:75:5:5:5 (mass ratio), Rh = 0.045 g/L | 63.3 |
| | Rh-loaded ZrLaY composite oxide $ZrO_2:La_2O_3:Y_2O_3$ = 84:6:10 (mass ratio), Rh = 0.009 g/L | 21.1 |
| | ZrLa alumina $ZrO_2:La_2O_3:Y_2O_3$ = 38:2:60 (mass ratio) | 7.0 |
| | Rh-doped CeZrNdY composite oxide binder $CeO_2:ZrO_2:Nd_2O_3:Y_2O_3$ = 10:80:5:5 (mass ratio), Rh = 0.05 mass % | 8.6 |
| Pd-containing catalyst layer (lower layer) | Pd-loaded CeZrNdLaY composite oxide $CeO_2:ZrO_2:Nd_2O_3:La_2O_3:Y_2O_3$ = 23:62:3:2:10 (mass ratio), Pd = 0.04 g/L | 31.3 |
| | Pd-loaded $La_2O_3$-containing alumina $La_2O_3$ = 4 mass %, Pd = 0.2 g/L | 41.0 |

TABLE 2-continued

| First catalysts A to C | Mass ratio |
|---|---|
| CeZrNdLaY composite oxide $CeO_2:ZrO_2:Nd_2O_3:La_2O_3:Y_2O_3$ = 23:62:3:2:10 (mass ratio) | 17.8 |
| yttria stabilized zirconia binder $Y_2O_3$ = 3 mol % | 9.9 |

ZrLa alumina is activated alumina loaded with ZrLa composite oxide.

The first catalysts A and B were subjected to an aging treatment in which the first catalysts A and B were held at 1000° C. for 24 hours in an atmospheric gas heat-treatment reactor (with 2% of $O_2$, 10% of $H_2O$, and residue of $N_2$).

Thereafter, a core sample having a substrate capacity of about 25 mL (with a diameter of 25.4 mm and a length of 50 mm) was cut out from each of the first catalysts A and B, and attached to a gas distribution reactor. Then, a light-off temperature T50 (° C.) and an exhaust gas purification efficiency C400 concerning purification of HC, CO, and NOx were measured. Here, T50 (° C.) is a catalyst inlet gas temperature measured by gradually increasing the temperature of a model exhaust gas flowing into a catalyst from room temperature, detecting changes in concentration of HC, CO, and NOx contained in a gas flowing out of the catalyst, and measuring the temperature when the purification efficiency of each of the components reaches 50%. C400 is a purification efficiency of each of HC, CO, and NOx when a model exhaust gas temperature at a catalyst inlet is 400° C.

The model exhaust gas was set at A/F=14.7±0.9. Specifically, A/F was forcedly caused to vibrate within an amplitude of ±0.9 by applying a predetermined amount of gas for changing in pulses at 1 Hz while steadily flowing a mainstream gas with an A/F of 14.7. The space velocity SV was 60000 $h^{-1}$ and a rate of temperature rise was 30° C./min. Table 3 shows gas compositions at A/F=14.7, A/F=13.8, and A/F=15.6.

TABLE 3

| A/F | 13.8 | 14.7 | 15.6 |
|---|---|---|---|
| $C_3H_6$ (ppm) | 541 | 555 | 548 |
| CO (%) | 2.35 | 0.60 | 0.59 |
| NO (ppm) | 975 | 1000 | 980 |
| $CO_2$ (%) | 13.55 | 13.90 | 13.73 |
| $H_2$ (%) | 0.85 | 0.20 | 0.20 |
| $O_2$ (%) | 0.58 | 0.60 | 1.85 |
| $H_2O$ (%) | 10 | 10 | 10 |
| $N_2$ | residue | residue | residue |

Figure 7:
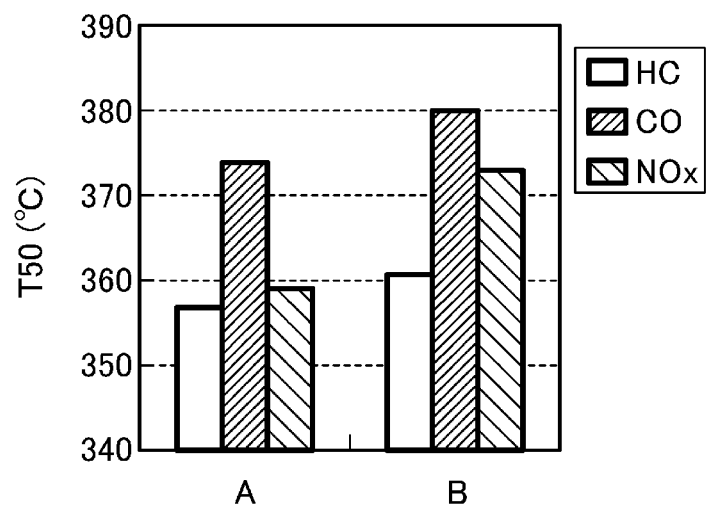
FIG. 7 is a graph showing light-off temperatures (T50) of first catalysts A and B.
Figure 8:
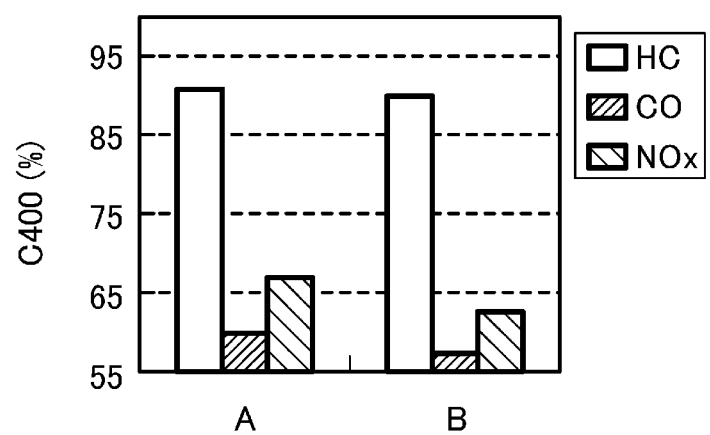
FIG. 8 is a graph showing high-temperature purification performances (C400) of the first catalysts A and B.

FIG. 7 shows results of T50 (° C.) of the first catalyst A (obtained by performing a reduction treatment on a Rh-doped CeZrNdY composite oxide binder) and the first catalyst B (without a reduction treatment). FIG. 8 shows results of C400 of the first catalysts A and B.

As shown in FIG. 7, T50 (° C.) of the first catalyst A concerning purification of HC, CO, and NOx is lower than that of the first catalyst B. As shown in FIG. 8, the purification efficiency of the first catalyst A for HC, CO, and NOx is higher than that of the first catalyst B. This is supposed to be because the reduction treatment performed on the Rh-loaded CeZrNdY composite oxide increased the amount of a metal Rh in the surface of the binder so that frequency of contact between the metal Rh and the exhaust gas increased.

For this reason, the use of the Rh-doped CeZr-based composite oxide binder subjected to the reduction treatment can enhance exhaust gas purification performance of the first catalyst.

[Reduction Treatment on Rh-loaded Zr-based Composite Oxide Material]

Then, a reduction treatment performed on a Rh-loaded Zr-based composite oxide material will be described. The reduction treatment of this embodiment is a CO reduction treatment in which heat treatment is performed on a material in a CO atmosphere.

To clarify an optimum heat treatment temperature of reduction treatment for enhancing a catalyst effect, a relationship between the degree of dispersion of the metal Rh in the surface of a composite oxide, which is a support, and a heat treatment temperature was examined Tests for the examination will be described below.

First, as a Rh-loaded Zr-based composite oxide, a Rh-loaded ZrLaY composite oxide was prepared. The composition of a ZrLaY composite oxide was $ZrO_2:La_2O_3:Y_2O_3=84:6:10$ (mass ratio), and a loading amount of Rh was 0.33% by mass. The Rh-loaded Zr-based composite oxide was subjected to CO pulse adsorption, thereby measuring the degree of dispersion of Rh in the surface of the Zr-based composite oxide.

Figure 9:
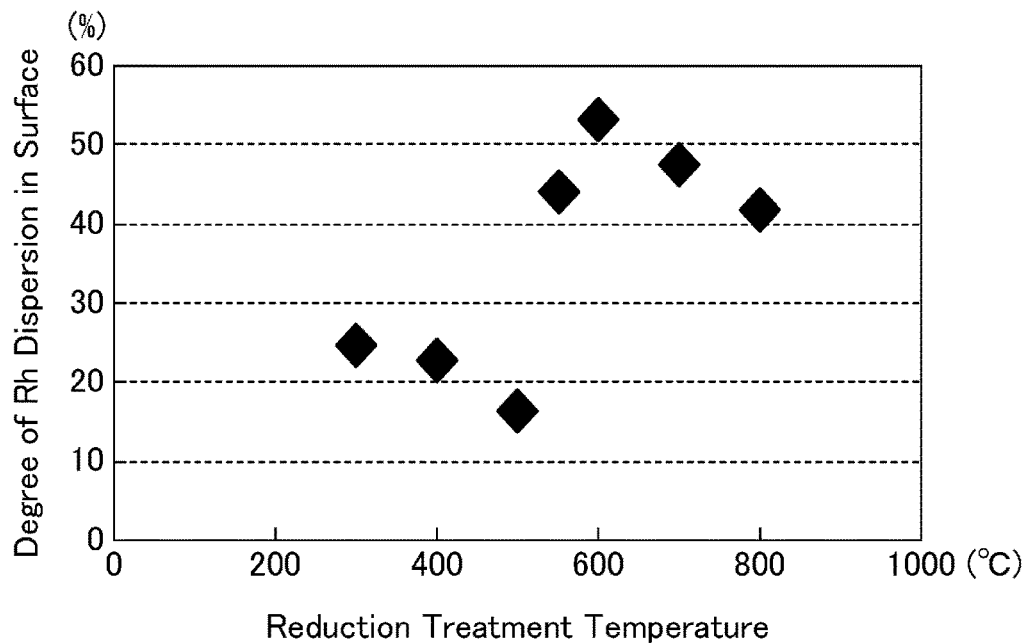
FIG. 9 is a graph showing a relationship between a reduction treatment temperature and the degree of dispersion of Rh in a support surface.

Before application of a CO pulse, to remove organic substances and moisture from the Rh-loaded Zr-based composite oxide, the temperature of the Rh-loaded Zr-based composite oxide was increased in an oxygen atmosphere from room temperature to 300° C. for 10 minutes. Once the temperature had reached 300° C., the Rh-loaded Zr-based composite oxide the temperature was kept at 300° C. for five minutes. Then, the temperature was increased from 300° C. to reduction treatment temperatures shown in Table 4. At this time, to maintain conditions of the catalyst surface until the temperature reached the reduction treatment temperatures, the supply of oxygen was stopped to create a vacuum state. After the temperature had reached the reduction treatment temperatures, the Rh-loaded Zr-based composite oxide was kept in a 100%-CO atmosphere, and was kept at the same temperatures for 10 minutes. After the reduction treatment, the temperature was reduced to the room temperature under the vacuum state, and a CO pulse was applied 30 times. The CO pulse application was carried out in such a manner that a valve was opened for 0.5 msec., and $9.38 \times 10^{-7}$ mol of CO was released for each pulse application. Table 4 below shows the degrees of dispersion of Rh and the amounts of CO adsorption under reduction treatment temperatures. FIG. 9 shows the degrees of dispersion of Rh under reduction treatment temperatures.

Here, the ratio of the metal Rh amount in the surface of a composite oxide derived from the amount of adsorbed CO, to the amount of loaded Rh calculated as a theoretical value from the amount of a prepared sample was obtained as the degree of dispersion.

As shown in Table 4 and FIG. 9, the degree of dispersion of Rh at a reduction treatment temperature greater than or equal to 300° C. and less than or equal to 500° C. was small, whereas the degree of dispersion rapidly increased at a temperature greater than or equal to 550° C. and less than or equal to 800° C. That is, when a reduction treatment is performed at a temperature of 550° C. to 800° C., both inclusive, the metal Rh is dispersed at a high degree of dispersion over the surface of the composite oxide, and the surface area of the metal Rh increases. As a result, the contact area of Rh with exhaust gas increases. In other words, a reduction treatment performed at a temperature of 550° C. to 800° C., both inclusive, can increase the number of active sites of the catalyst, thereby enhancing catalyst performance. From the results shown in Table 4 and FIG. 9, the heat treatment temperature for the reduction treatment is preferably in the range from 550° C. to 700° C., both inclusive, and more preferably in the range from 600° C. to 700° C., both inclusive.

[Advantages of Reduction Treatment of Rh-loaded Zr-based Composite Oxide Material]

As the first catalyst 41, a first catalyst C obtained by performing a reduction treatment on a Rh-loaded ZrNdY composite oxide (at 600° C. in a 1%-CO atmosphere for five minutes) and the first catalyst B were prepared. The catalyst composition of the first catalyst C is shown in Table 2.

Figure 10:
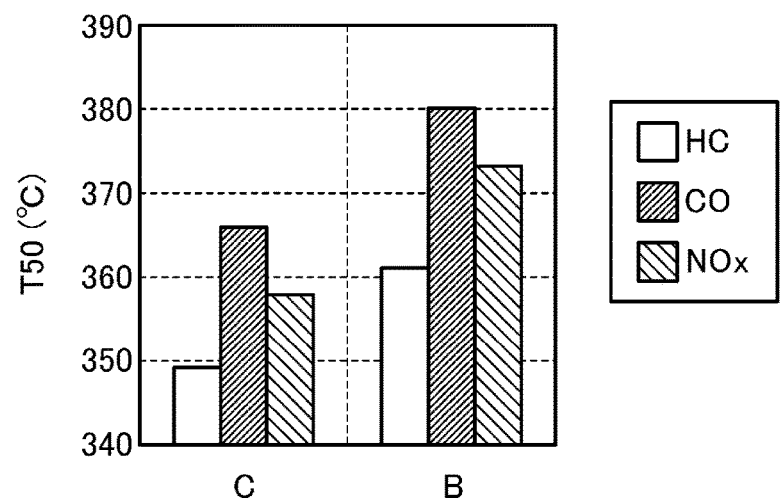
FIG. 10 is a graph showing light-off temperatures (T50) of first catalysts B and C.
Figure 11:
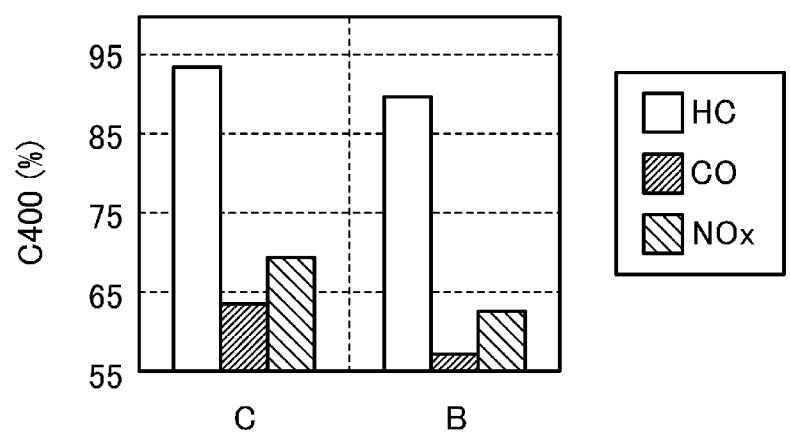
FIG. 11 is a graph showing high-temperature purification performances (C400) of the first catalysts B and C.

The first catalysts B and C were subjected to the same aging treatment as that performed on the first catalysts A and B, and then, T50 and C400 were measured under the same conditions by the same method as those of the first catalysts A and B. FIG. 10 shows results on T50, and FIG. 11 shows results on C400.

As shown in FIG. 10, T50 (° C.) of the first catalyst C concerning purification of HC, CO, and NOx is lower than that of the first catalyst B. As shown in FIG. 11, the purification efficiency of the first catalyst C for HC, CO, and NOx is higher than that of the first catalyst B. This is supposed to be because the reduction treatment performed on the Rh-loaded ZrLaY composite oxide increased the amount of the metal Rh in the surface of the composite oxide so that frequency of contact between the metal Rh and the exhaust gas increased.

For this reason, the use of the Rh-loaded Zr-based composite oxide subjected to the reduction treatment can enhance exhaust gas purification performance of the first catalyst.

<Saturated HC Purification Performance of First Catalyst and Second Catalyst>

TABLE 4

| Treatment temperature ° C. | Amount of prepared sample g | Theoretical amount of Rh loading number | Amount of one pulse mol | Co adsorption amount mol | Rh amount number | Degree of dispersion % |
|---|---|---|---|---|---|---|
| 300 | 0.193 | $3.73 \times 10^{18}$ | $9.38 \times 10^{-7}$ | $1.52 \times 10^{-6}$ | $9.16 \times 10^{17}$ | 24.5 |
| 400 | 0.200 | $3.86 \times 10^{18}$ | $9.38 \times 10^{-7}$ | $1.46 \times 10^{-6}$ | $8.80 \times 10^{17}$ | 22.8 |
| 500 | 0.195 | $3.76 \times 10^{18}$ | $9.38 \times 10^{-7}$ | $1.01 \times 10^{-6}$ | $6.11 \times 10^{17}$ | 16.2 |
| 550 | 0.200 | $3.86 \times 10^{18}$ | $9.38 \times 10^{-7}$ | $2.82 \times 10^{-6}$ | $1.70 \times 10^{18}$ | 44.0 |
| 600 | 0.191 | $3.69 \times 10^{18}$ | $9.38 \times 10^{-7}$ | $3.27 \times 10^{-6}$ | $1.97 \times 10^{18}$ | 53.2 |
| 700 | 0.200 | $3.86 \times 10^{18}$ | $9.38 \times 10^{-7}$ | $3.05 \times 10^{-6}$ | $1.83 \times 10^{18}$ | 47.5 |
| 800 | 0.187 | $3.62 \times 10^{18}$ | $9.38 \times 10^{-7}$ | $2.51 \times 10^{-6}$ | $1.51 \times 10^{18}$ | 41.8 |

A first catalyst D (Pt loading amount=0 g/L) having a composition shown in Table 5 was prepared as the first catalyst 41. A second catalyst A (Pt loading amount=6.6 g/L) having a composition shown in Table 6 was prepared as the second catalyst 42. A Pt-containing first catalyst E (Pt loading amount=6.0 g/L) having a composition shown in Table 7 was prepared.

TABLE 5

| First catalyst D | | Loading amount |
|---|---|---|
| Rh-containing catalyst layer (upper layer) | Rh-loaded CeZrNd composite oxide $CeO_2:ZrO_2:Nd_2O_3$ = 10:80:10 (mass ratio), Rh = 0.2 g/L | 90.2 g/L |
| | Rh-loaded ZrLaY alumina $ZrO_2:La_2O_3:Al_2O_3$ = 38:2:60 (mass ratio), Rh = 0.1 g/L | 29.7 g/L |
| | $La_2O_3$-containing alumina $La_2O_3$ = 4 mass % | 12.8 g/L |
| | yttria stabilized zirconia binder $Y_2O_3$ = 3 mol % | 12.8 g/L |
| Pd-containing catalyst layer (lower layer) | Pd-loaded CeZrNd composite oxide $CeO_2:ZrO_2:Nd_2O_3$ = 23:67:10 (mass ratio), Pd = 0.3 g/L | 35.3 g/L |
| | Pd-loaded $La_2O_3$-containing alumina $La_2O_3$ = 4 mass %, Pd = 4.4 g/L | 49.6 g/L |
| | CeZrNd composite oxide $CeO_2:ZrO_2:Nd_2O_3$ = 55:35:10 (mass ratio) | 10.0 g/L |
| | yttria stabilized zirconia binder $Y_2O_3$ = 3 mol % | 7.7 g/L |

ZrLa alumina is activated alumina loaded with ZrLa composite oxide.

TABLE 6

| Second catalyst A | | Loading amount |
|---|---|---|
| Pt-containing catalyst layer | Pt-loaded $La_2O_3$-containing alumina $La_2O_3$ = 4 mass %, Pt = 6.6 g/L | 126.6 g/L |
| | $La_2O_3$-containing alumina $La_2O_3$ = 4 mass % | 20.0 g/L |
| | CeZrNd composite oxide $CeO_2:ZrO_2:Nd_2O_3$ = 55:35:10 (mass ratio) | 20.0 g/L |
| | yttria stabilized zirconia binder $Y_2O_3$ = 3 mol % | 12.8 g/L |

TABLE 7

| Pt-containing first catalyst E | | Loading amount |
|---|---|---|
| Rh-containing catalyst layer (upper layer) | Rh-loaded CeZrNd composite oxide $CeO_2:ZrO_2:Nd_2O_3$ = 10:80:10 (mass ratio), Rh = 0.2 g/L | 50.2 g/L |
| | Rh-loaded ZrLa alumina $ZrO_2:La_2O_3:Al_2O_3$ = 38:2:60 (mass ratio), Rh = 0.1 g/L | 15.1 g/L |
| | Pt-loaded $La_2O_3$-containing alumina $La_2O_3$ = 4 mass %, Pt = 6.0 g/L | 126.0 g/L |
| | yttria stabilized zirconia binder $Y_2O_3$ = 3 mol % | 12.8 g/L |
| Pd-containing catalyst layer (lower layer) | Pd-loaded CeZrNd composite oxide $CeO_2:ZrO_2:Nd_2O_3$ = 23:67:10 (mass ratio), Pd = 0.3 g/L | 20.3 g/L |
| | Pd-loaded $La_2O_3$-containing alumina $La_2O_3$ = 4 mass %, Pd = 4.4 g/L | 47.4 g/L |
| | CeZrNd composite oxide $CeO_2:ZrO_2:Nd_2O_3$ = 55:35:10 (mass ratio) | 0 g/L |
| | yttria stabilized zirconia binder $Y_2O_3$ = 3 mol % | 7.7 g/L |

ZrLa alumina is activated alumina loaded with ZrLa composite oxide.

Here, "Pt-containing first catalyst" refers to a catalyst in which Pt as a catalytic metal is added to the first catalyst. Pt was added to the Pt-containing first catalyst E by replacing "12.8 g/L of $La_2O_3$-containing alumina" of the Rh-containing catalyst layer of the first catalyst D with "126.0 g/L of Pt-loaded $La_2O_3$-containing alumina." With this addition, the amount of the support loaded with Rh of the Rh-containing catalyst layer and the amount of the support loaded with Pd of the Pd-containing catalyst layer are reduced, and the loading amount of the CeZrNd composite oxide of the Pd-containing catalyst layer is set at zero.

As the honeycomb substrate, "square cell, 3.5 mil/600 cpsi, bulk density of 0.292 g/cm$^3$" was used for the first catalyst D and the Pt-containing first catalyst E, and "hexagonal cell, 3.5 mil/600 cpsi, bulk density of 0.276 g/cm$^3$" was used for the second catalyst A. These substrates are made of the same cordierite, and the difference in bulk density makes the thermal capacity of the second catalyst A smaller than the thermal capacities of the first catalyst D and the Pt-containing first catalyst E.

Bench aging was performed on the first catalyst D, the second catalyst A, and the Pt-containing first catalyst E. In this bench aging, the catalyst was attached to an exhaust pipe of the engine, the number of revolutions per minute of the engine and the load were set so that the catalyst temperature was at 880° C., and the catalyst was exposed to an exhaust gas of the engine for 100 hours. During an operation period of the engine, P-added engine oil was continuously supplied to an intake manifold by pumping.

After the bench aging, a core sample having a substrate capacity of 25 mL was taken out from each catalyst, and was attached to a model gas distribution reactor. Then, a model gas (containing iso-pentane) as a model of an exhaust gas when the engine operates with HCCI combustion was caused to flow, the gas temperature of the model gas was gradually increased from room temperature, and an iso-pentane purification efficiency was measured. The model gas has a composition of iso-pentane: 1600 ppmC, CO: 1700 ppm, $O_2$: 10.5%, $CO_2$: 13.9%, $H_2O$: 10%, and residue: $N_2$. The space velocity SV was about 60000 h$^{-1}$, and the rate of temperature rise of the gas was 30° C./min.

Figure 12:
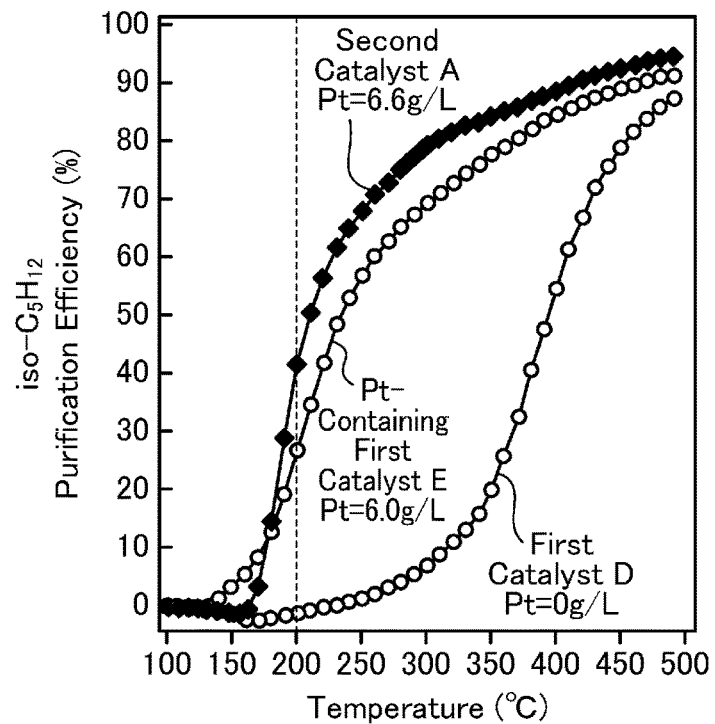
FIG. 12 is a graph showing iso-pentane purification properties of a first catalyst D, a second catalyst A, and a Pt-containing first catalyst E.

FIG. 12 shows the results. The first catalyst D (having a two-layer structure of the Rh-containing catalyst layer and the Pd-containing catalyst layer and not containing Pt) had a low iso-pentane purification efficiency. On the other hand, the second catalyst A (including only the Pt-containing catalyst layer) and the Pt-containing first catalyst E (in which Pt-loaded alumina was added to the Rh-containing catalyst layer of the first catalyst D) had an iso-pentane purification efficiency higher than that of the first catalyst D. The temperature (T50) at which the purification efficiency of iso-pentane is 50% is about 210° C. for the second catalyst A, about 230° C. for the Pt-containing first catalyst E, and about 400° C. for the first catalyst D. That is, the second catalyst A shows activity to iso-pentane purification at low temperatures.

In particular, noticeably, the second catalyst A including only the Pt-containing catalyst layer has an iso-pentane purification efficiency higher than that of the Pt-containing first catalyst E from a low temperature less than or equal to 200° C.

The Pt loading amount of the second catalyst A is slightly larger than that of the Pt-containing first catalyst E, but the difference in iso-pentane purification efficiency between the second catalyst A and the Pt-containing first catalyst E is due to not only a difference in Pt loading amount.

Figure 13:
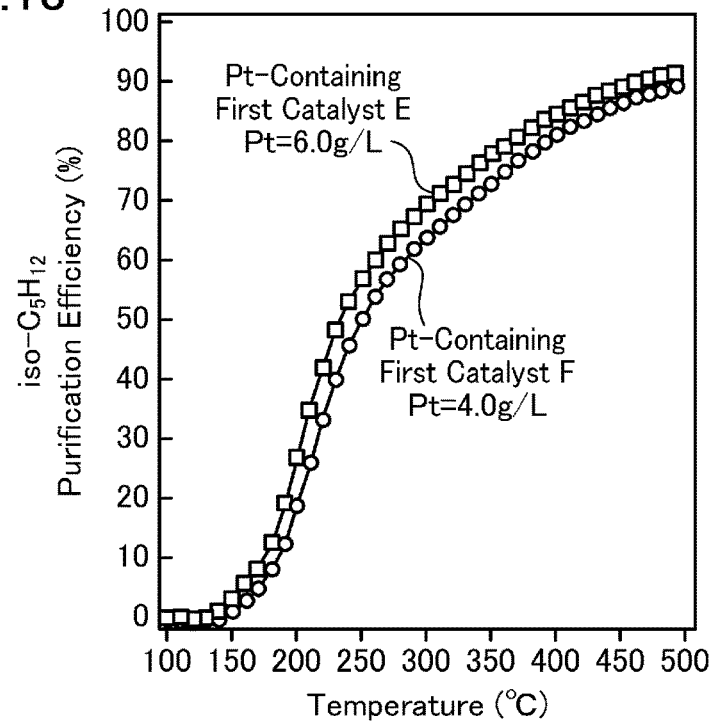
FIG. 13 is a graph showing iso-pentane purification properties of Pt-containing first catalysts E and F.

This is clearly shown from a comparison result between the Pt-containing first catalyst E and the Pt-containing first catalyst F in FIG. 13. The Pt-containing first catalyst E and the Pt-containing first catalyst F have the same structure except that the Pt loading amount of the former was 6.0 g/L and the Pt loading amount of the latter was 4.0 g/L. FIG. 13 shows results obtained by measuring iso-pentane purification efficiencies of the Pt-containing first catalysts E and F under the same evaluation condition (described above). As shown in FIGS. 12 and 13, the difference in iso-pentane purification efficiency between a case where the Pt loading amount was 4.0 g/L and a case where the Pt loading amount was 6.0 g/L was smaller than the difference in iso-pentane purification efficiency between the second catalyst A and the Pt-containing first catalyst E. This shows that the difference in iso-pentane purification efficiency between the second catalyst A and the Pt-containing first catalyst E is not only due to the difference in Pt loading amount but also from the other reasons. This is supposed to be because of the following reasons.

The Pt-loaded alumina catalyst is effective for purification of iso-pentane. In the Pt-containing first catalyst E, Pt-loaded alumina is contained in the Rh-containing catalyst layer where both Pt and Rh are contained, and the Pd-containing catalyst layer is provided. Thus, iso-pentane is not necessarily adsorbed in active sites (Pt) effective for purification thereof, but is also adsorbed in other active sites (Pd and Rh) ineffective for purification thereof and often desorbed and discharged without purification. Accordingly, iso-pentane purification does not efficiently proceed as a whole. In other words, it is estimated that even when there are a large number of active sites (Pt) effective for iso-pentane purification, iso-pentane is also diffused to a place including no active sites (Pt), and thus, these active sites (Pt) are not effectively used for iso-pentane purification.

On the other hand, the second catalyst A contains only Pt as a catalytic metal, and thus, iso-pentane frequently comes into contact with the active sites (Pt). Thus, it is expected that iso-pentane purification proceeds efficiently.

<Examination of Pt-containing First Catalyst Concerning Iso-pentane Purification>

Pt-containing first catalysts G, H, and I were prepared, and iso-pentane purification efficiencies thereof were measured under the same evaluation conditions as those described above. Each of the Pt-containing first catalysts G, H, and I contained 84.0 g/L (Pt=4.0 g/L) of Pt-loaded $La_2O_3$-containing alumina, and arrangement thereof were different among the catalysts G, H, and I.

In the Pt-containing first catalyst G, "Pt-loaded $La_2O_3$-containing alumina=126.0 g/L, Pt=6.0 g/L" of the Rh-containing catalyst layer of the Pt-containing first catalyst E shown in Table 7 was replaced with "Pt-loaded $La_2O_3$-containing alumina=84.0 g/L, Pt=4.0 g/L."

In the Pt-containing first catalyst H, "Pt-loaded $La_2O_3$-containing alumina=126.0 g/L, Pt=6.0 g/L" of the Rh-containing catalyst layer of the Pt-containing first catalyst E shown in Table 7 was replaced with "Pt-loaded $La_2O_3$-containing alumina=42.0 g/L, Pt=2.0 g/L" and "Pt-loaded $La_2O_3$-containing alumina=42.0 g/L, Pt=2.0 g/L" was added to the Pd-containing catalyst layer.

In the Pt-containing first catalyst I, the Pt-containing catalyst layer was stacked on the Rh-containing catalyst layer of the first catalyst D shown in Table 5 so that a three-layer structure was formed. The Pt-containing catalyst layer had a composition of "Pt-loaded $La_2O_3$-containing alumina=84.0 g/L, Pt=4.0 g/L"+"yttria stabilized zirconia binder ($Y_2O_3$=3 mol %)=7.0 g/L."

Figure 14:
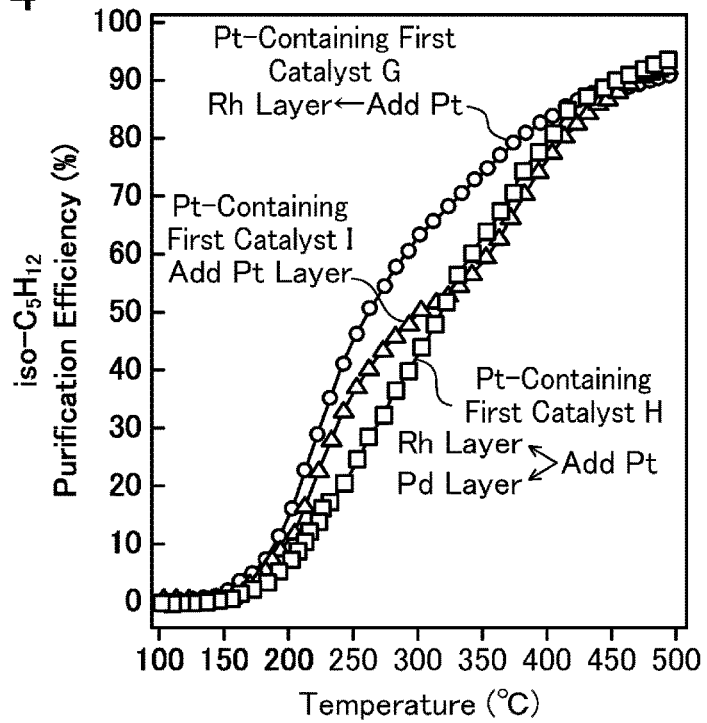
FIG. 14 is a graph showing iso-pentane purification properties of Pt-containing first catalysts G to I.

FIG. 14 shows measurement results of iso-pentane purification efficiencies of the Pt-containing first catalysts G, H, and I. The results shown in FIGS. 12 and 13 suggest that the addition of the Pt-containing catalyst layer without Pt being added to the Rh-containing catalyst layer enhances iso-pentane purification efficiency. However, FIG. 14 shows that the Pt-containing first catalyst I with the addition of the Pt-containing catalyst layer has an iso-pentane purification efficiency lower than that of the Pt-containing first catalyst G in which Pt was added to the Rh-containing catalyst layer. This is supposed to be because the presence of the Pt-containing catalyst layer on the Rh-containing catalyst layer reduces the thickness of the Pt-containing catalyst layer. That is, it is supposed that iso-pentane is long molecules, and thus, is not readily trapped in the thin Pt-containing catalyst layer so that the purification efficiency is low.

As shown in FIG. 14, the Pt-containing first catalyst H in which Pt is contained in both the Rh-containing catalyst layer and the Pd-containing catalyst layer had the lowest iso-pentane purification efficiency. This is supposed to be because iso-pentane was not adsorbed in active sites (Pt) effective for purification thereof but was frequently adsorbed in other active sites (Pd and Rh).

From the foregoing examination results on the Pt-containing first catalyst, to enhance an iso-pentane purification efficiency, it is preferable to provide a second catalyst including only the Pd-containing catalyst layer and containing neither Pd nor Rh in addition to the first catalyst including the Rh-containing catalyst layer and the Pd-containing catalyst layer.

<Unsaturated HC Purification Performance of Second Catalyst and Pt-containing First Catalyst>

As described above, the second catalyst A including only the Pd-containing catalyst layer is suitable for purification of saturated HC. Thus, to examine unsaturated HC purification performance of the second catalyst A, Pt-containing first catalysts J and K were prepared for comparison.

In the Pt-containing first catalyst J, "Pt-loaded $La_2O_3$-containing alumina=126.0 g/L, Pt=6.0 g/L" of the Rh-containing catalyst layer of the Pt-containing first catalyst E shown in Table 7 was replaced by "Pt-loaded $La_2O_3$-containing alumina=44.0 g/L, Pt=4.0 g/L."

The Pt-containing first catalyst K was prepared based on the catalyst composition of the first catalysts A to C shown in Table 2, and had a composition shown in Table 8. The Pt-containing first catalyst K is different from the first catalysts A to C in that, for example, Pt-loaded alumina is contained in the Rh-containing catalyst layer and a reduction treatment is performed on both a Rh-loaded CeZrNdLaY composite oxide and a Rh-doped CeZrNdY composite oxide (binder).

TABLE 8

| | Pt-containing first catalyst K | Loading amount |
|---|---|---|
| Rh-containing catalyst layer (upper layer) | Rh-loaded CeZrNdLaY composite oxide $CeO_2:ZrO_2:Nd_2O_3:La_2O_3:Y_2O_3$ = 10:75:5:5:5 (mass ratio), Rh = 0.6 g/L | 90.0 g/L |
| | Rh-loaded ZrLaY alumina $ZrO_2:La_2O_3:Y_2O_3$ = 84:6:10 (mass ratio), Rh = 0.1 g/L | 30.0 g/L |
| | Pt-loaded $La_2O_3$-containing alumina $La_2O_3$ = 4 mass %, Pt = 4.0 g/L | 40.4 g/L |
| | Rh-doped CeZrNdY composite oxide binder $CeO_2:ZrO_2:Nd_2O_3:Y_2O_3$ = 10:80:5:5 (mass ratio), Rh = 0.05 mass % | 12.2 g/L |
| Pd-containing catalyst layer (lower layer) | Pd-loaded CeZrNd composite oxide $CeO_2:ZrO_2:Nd_2O_3:Y_2O_3$ = 23:62:3:2:10 (mass ratio), Pd = 0.47 g/L | 35.47 g/L |
| | Pd-loaded $La_2O_3$-containing alumina $La_2O_3$ = 4 mass %, Pd = 2.33 g/L | 47.33 g/L |

TABLE 8-continued

| Pt-containing first catalyst K | | Loading amount |
|---|---|---|
| CeZrNdLaY composite oxide $CeO_2:ZrO_2:Nd_2O_3La_2O_3:Y_2O_3 =$ 23:62:3:2:10 (mass ratio) | | 20.0 g/L |
| yttria stabilized zirconia binder $Y_2O_3 = 3$ mol % | | 11.0 g/L |

Figure 15:
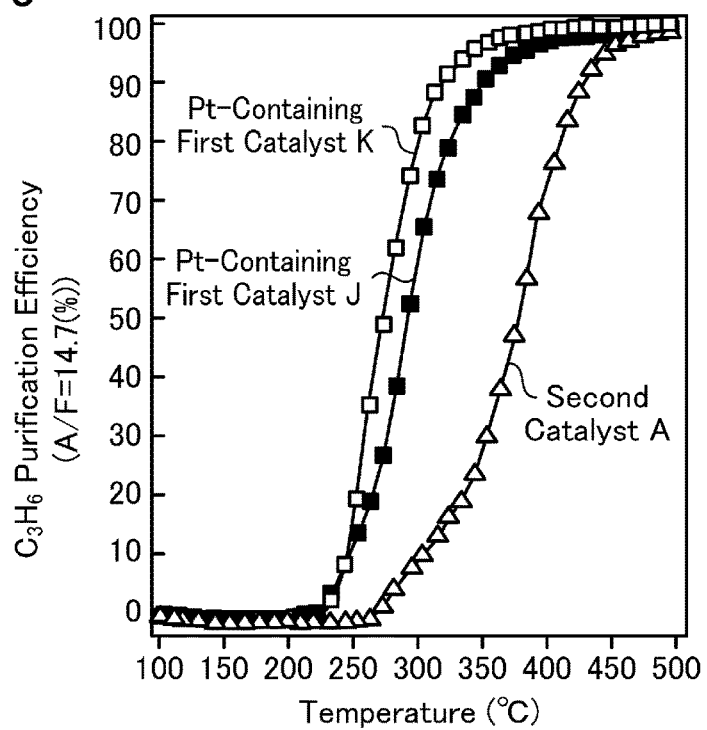
FIG. 15 is a graph showing propylene purification properties of the second catalyst A and Pt-containing first catalysts J and K.

The second catalyst A and the Pt-containing first catalysts J and K were subjected to the bench aging described above, then a core sample having a substrate capacity of 25 mL was taken from each of the catalysts and attached to a model gas distribution reactor. Then, using a model gas (containing propylene ($C_3H_6$)) shown in Table 3 as a model of an exhaust gas when the engine operates with SI combustion, propylene purification efficiencies were measured under the same conditions as those for measurements of T50 and C400 described above. FIG. 15 shows the results.

As shown in FIG. 15, the second catalyst A had a high iso-pentane purification efficiency (FIG. 12), but had a propylene purification efficiency lower than those of the Pt-containing first catalysts J and K. In other words, the Pt-containing first catalysts J and K had high propylene purification efficiencies. The temperature (T50) at which the propylene purification efficiency is 50% is about 270° C. in the Pt-containing first catalyst K, about 290° C. in the Pt-containing first catalyst J, and 370° C. in the second catalyst A. The Pt-containing first catalysts J and K show activity to propylene purification at temperatures lower than that of the second catalyst A.

With respect to the catalytic metal amounts of the Pt-containing first catalyst J and the Pt-containing first catalyst K, the Pt loading amounts of both the catalysts were 4.0 g/L. The Rh-loading amount was 0.3 g/L in the former and 0.7 g/L in the latter, and the Pd-loading amount was 4.7 g/L in the former and 2.8 g/L in the latter. That is, the loading amount of a combination of Rh and Pd was 5 g/L in the Pt-containing first catalyst J, and was 3.5 g/L in the Pt-containing first catalyst K, which is smaller than that of the Pt-containing first catalyst J.

As described above, although the Pt-containing first catalyst K had a catalytic metal amount smaller than that of the Pt-containing first catalyst J, especially had a small Pd amount effective for propylene purification, the propylene purification efficiency of the Pt-containing first catalyst K was higher than that of the Pt-containing first catalyst J, as shown in FIG. 15. This is supposed to be because the reduction treatment was performed on the Rh-loaded CeZrNdLaY composite oxide and the Rh-doped CeZrNdY composite oxide (binder) of the Pt-containing first catalyst K.

From FIG. 15, it is expected that the Pt-loaded alumina of the Pt-containing first catalysts J and K does not effectively act on propylene purification because of a low propylene purification efficiency of the second catalyst A including the Pt-containing catalyst layer, and the Pd-containing catalyst layer and the Rh-containing catalyst layer effectively act on propylene purification.

Thus, the first catalyst not containing Pt shows an effect of propylene purification to a degree similar to the Pt-containing first catalyst, or as described above, Pt can be supposed to inhibit propylene purification by Pd. Thus, it is expected that the first catalyst not containing Pt has propylene purification performance higher than that of the Pt-containing first catalyst.

<Evaluation of HC Light-off Performance with Engine Bench>

Two types of catalyst converters in each of which the first catalyst and the second catalyst were disposed in series and placed in one catalyst container were prepared. Specifically, in one of the catalyst converters, the first catalyst was disposed upstream of the second catalyst in the exhaust gas flow direction, and in the other catalyst converter, the second catalyst was disposed upstream of the first catalyst in the exhaust gas flow direction. Table 9 shows compositions of the first catalyst and the second catalyst.

TABLE 9

| | | Loading amount |
|---|---|---|
| Pt-containing catalyst (second catalyst) | Pd-loaded $La_2O_3$-containing alumina $La_2O_3$ = 4 mass %, Pd = 7.0 g/L | 120 g/L |
| | yttria stabilized zirconia binder $Y_2O_3$ = 3 mol % | 11 g/L |
| Pd/Rh-containing catalyst (lower layer of first catalyst) | Pd-loaded CeZrNd composite oxide $CeO_2:ZrO_2:Nd_2O_3$ = 23:67:10 (mass ratio), Pd = 1.0 g/L | 35.0 g/L |
| | Pd-loaded $La_2O_3$-containing alumina $La_2O_3$ = 4 mass %, Pd = 5.4 g/L | 45.0 g/L |
| | yttria stabilized zirconia binder $Y_2O_3$ = 3 mol % | 11.0 g/L |
| Pd/Rh-containing catalyst (upper layer of first catalyst) | Rh-loaded CeZrNd composite oxide $CeO_2:ZrO_2:Nd_2O_3$ = 10:80:10 (mass ratio), Rh = 0.47 g/L | 90.0 g/L |
| | Rh-loaded ZrLa alumina $ZrO_2:La_2O_3:Al_2O_3$ = 38:2:60 (mass ratio), Rh = 0.13 g/L | 30.0 g/L |
| | yttria stabilized zirconia binder $Y_2O_3$ = 3 mol % | 11.0 g/L |

The catalyst converters were attached to an exhaust pipe of an engine bench, and the engine was operated in each of the HCCI combustion mode and the SI combustion mode, thereby measuring a light-off temperature concerning HC purification in each mode. The light-off temperature is a catalyst container inlet gas temperature obtained when the inlet gas temperature of the catalyst container increases with the operation of the engine so that the HC purification efficiency reaches 50%. The light-off temperature was measured for a case where bench aging was previously performed on both of the catalysts and a case of fresh where no bench aging was performed.

In a manner similar to that of the bench aging described above, in the bench aging, the number of revolutions per minute of the engine and the load were set so that the inlet temperature of the catalyst container was 880° C. and the engine was operated for 100 hours. During this operation, P-added engine oil was continuously supplied to the intake manifold by pumping. In the bench aging, the engine was operated in the SI combustion mode. This operation is the same as that in the bench aging described above. Table 10 shows measurement results of light-off temperatures.

TABLE 10

|  |  | upstream first catalyst (Pd, Rh) → | downstream second catalyst (Pt) | upstream first catalyst (Pt) → | downstream second catalyst (Pd, Rh) |
|---|---|---|---|---|---|
| Fresh | SI combustion | 172° C. | | 153° C. | |
| | HCCI combustion | 155° C. | | 178° C. | |
| Aged | SI combustion | 251° C. | | 248° C. | |
| | HCCI combustion | 212° C. | | 247° C. | |

When being fresh, the light-off temperature was lower in the case where the second catalyst was disposed upstream in the SI combustion, and the light-off temperature was lower in the case where the first catalyst was disposed upstream in the HCCI combustion. After aging, the light-off temperature was lower in the case where the second catalyst was disposed upstream in the SI combustion, and the light-off temperature was lower in the case where the first catalyst was disposed upstream in the HCCI combustion. From these results, in the ternary-system catalyst of Pt/Pd/Rh, a case where a Pt catalyst containing neither Pd nor Rh is independently provided can be concluded as follows. The light-off performance is substantially the same between a case where the Pt catalyst is disposed upstream of another catalyst (Pd/Rh catalyst) and a case where the Pt catalyst is disposed downstream of another catalyst (Pd/Rh catalyst).

<Externally Heated Exhaust Gas Purification Catalyst Device>

Figure 16:
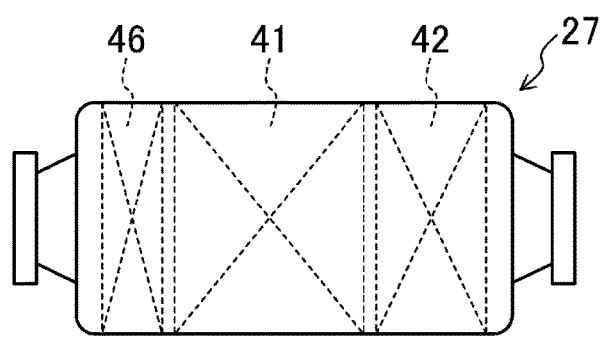
FIG. 16 is a side view illustrating an example of an exhaust gas purification catalyst device provided with an electric heater.

FIG. 16 illustrates a configuration of an externally heated exhaust gas purification catalyst device 27. This catalyst device 27 includes an electric heater 46 as an external heating unit for heating the first catalyst 41 and the second catalyst 42. The catalysts 41 and 42 and the electric heater 46 are arranged in series and housed in one catalyst container. The first catalyst 41 is disposed upstream of the second catalyst 42 in the exhaust gas flow direction, and the electric heater 46 is disposed upstream of the first catalyst 41 in the exhaust gas flow direction.

The catalyst container s provided with a temperature sensor 47 for detecting a temperature of the first catalyst 41. An operation of the electric heater 46 is controlled based on the temperature of the first catalyst 41 and an operating state of the engine. Specifically, when it is determined that the engine is in a transient operating state from the HCCI range to the SI range (i.e., an increase in accelerator position is detected) based on the engine operating state, a heating operation of the electric heater 46 is started. Then, when the temperature of the first catalyst 41 detected by the temperature sensor 47 reaches a predetermined temperature, the operation of the electric heater 46 is stopped.

[NOx Purification Evaluation Test in Combustion Mode Switching]

Effects of an operation of the electric heater on NOx purification in switching of the combustion mode (from HCCI combustion to SI combustion) were evaluated by using a model exhaust gas.

In this evaluation, the first catalyst B (not subjected to the reduction treatment) shown in Table 2 and the second catalyst A shown in Table 6 were employed. These catalysts were core samples each having a substrate capacity of 25 mL and subjected to the bench aging described above. The catalysts were attached to a model gas distribution reactor. The first catalyst B was disposed upstream of the second catalyst A in the exhaust gas flow direction, and the electric heater was disposed upstream of the first catalyst B.

Then, NOx purification efficiencies of Example 1 (constant temperature case) in which the model gas was switched (from HCCI to SI) with a constant inlet gas temperature of the first catalyst B and Example 2 (temperature rise case) in which the model gas was switched by increasing the inlet gas temperature with the electric heater were obtained. Table 11 shows model gas conditions simulating an exhaust gas in HCCI combustion and an exhaust gas in SI combustion. An HCCI lean model gas (1) contained no NOx. An SI stoichiometric model gas (2) contained 1000 ppm of NOx.

TABLE 11

| Gas conditions | (1) HCCI lean | (2) SI stoichiometric |
|---|---|---|
| iso-$C_5H_{12}$ (ppmC) | 1800 | — |
| $C_3H_6$ (ppmC) | — | 1600 |
| CO (%) | 0.17 | 0.8 |
| NOx (ppm) | — | 1000 |
| $CO_2$ (%) | 13.9 | 13.6 |
| $H_2$ (%) | — | 0.2 |
| $O_2$ (%) | 10.5 | 0.86 |
| $H_2O$ (%) | 10 | 10 |
| $N_2$ | residue | residue |
| space velocity SV ($h^{-1}$) | 60000 | 60000 |

A specific technique for measuring the NOx purification efficiency will now be described.

In stoichiometric conditions (SI stoichiometric model gas in Table 11), the inlet gas temperature of the first catalyst B was increased and kept at 500° C. for 10 minutes (pretreatment), and then, the inlet gas temperature was reduced to 100° C. by flowing an $N_2$ gas. Thereafter, the state was returned back to the stoichiometric conditions, and the inlet gas temperature was increased to 200° C.

In Example 1 (constant temperature case), after the inlet gas temperature had reached 200° C., the HCCI-lean model gas (1) and the SI stoichiometric model gas (2) shown in Table 11 were caused to alternately flow at every about 120 to 130 seconds, and a change in NOx concentration (ppm) of a gas flowing from the second catalyst A was measured.

In Example 2 (temperature rise case), the temperature rise started at 100° C./min with the electric heater about 60 seconds before switching of the model gas from HCCI to SI. In this manner, the inlet gas temperature in switching of the model gas was set at 300° C., and at the time when the inlet gas temperature further increased to 350° C., the inlet gas temperature was kept at 350° C. for about 30 seconds. Then, the temperature was started decreasing about 60 seconds before switching of the model gas from SI to HCCI, and at the time when the inlet gas temperature reached 200° C., the temperature was kept at 200° C. for about 30 seconds. In this manner, the temperature rise and the temperature decrease were repeated in the range from 200 to 350° C. so that the inlet gas temperature was at about 300° C. in switching of the model gas from HCCI to SI.

—NOx Purification Efficiency—

Figure 17:
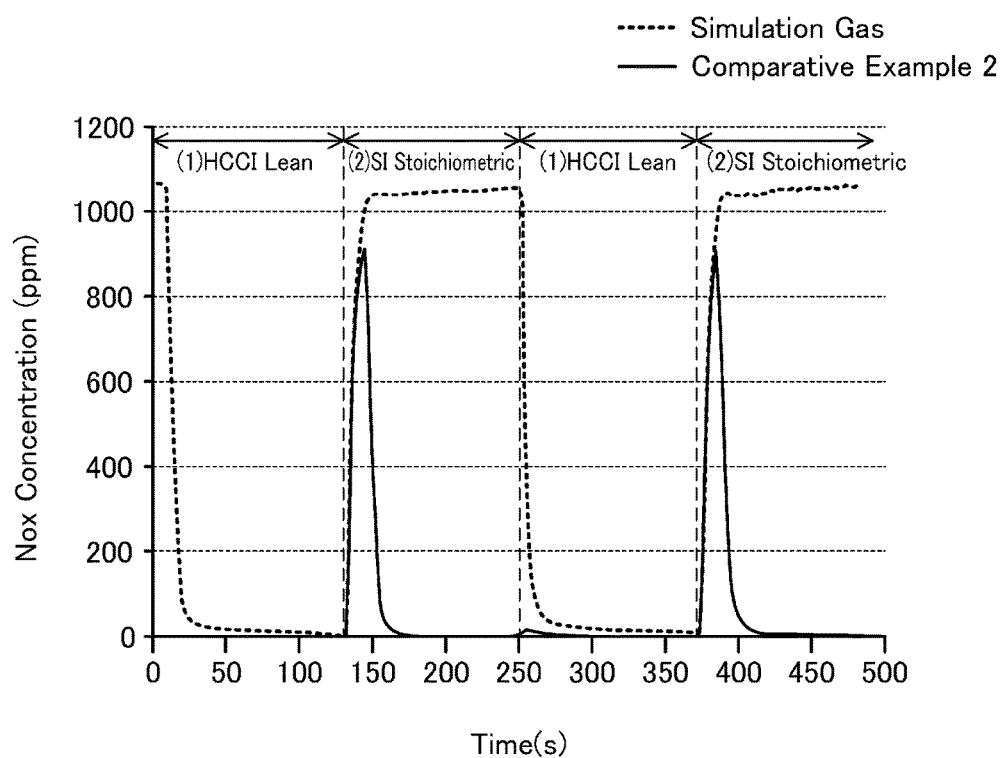
FIG. 17 is a graph illustrating changes with time in a NOx concentration of a gas flowing into a catalyst device and a gas flowing out of the catalyst device in a switching transition period from HCCI to SI.

FIG. 17 shows NOx concentration measurement results of Example 1 (constant temperature case). In FIG. 17, a broken line indicates a NOx concentration of a gas flowing into the first catalyst B, and a solid line indicates a NOx concentration of a gas flowing from the second catalyst A. As shown in FIG. 17, the NOx concentration (indicated by the solid line) of the effluent gas was substantially zero from about 30 seconds after switching from HCCI to SI to next switching from SI to HCCI, and NOx was purified by the first catalyst B. However, in a period of about 30 seconds from the switching from HCCI to SI, NOx purification by the first catalyst B did not efficiently proceed.

A NOx purification efficiency P in an SI stoichiometric period after switching from HCCI to SI in each of Example 1 (constant temperature case) and Example 2 (temperature rise case) was calculated by Equation (1):

$$P=(X-Y)/X \quad (1)$$

where X is an integrated value of a NOx concentration (ppm) of an influent gas in an SI stoichiometric period, and Y is an integrated value of NOx concentrations (ppm) of an effluent gas in the same period. Table 12 shows the results.

TABLE 12

|  | Temperature conditions | NOx purification efficiency |
|---|---|---|
| Example 1 | 200° C. (constant) | 89.6% |
| Example 2 | 200° C. → 350° C. (temperature rise) | 92.7% |

In Example 2 (temperature rise case), the NOx purification efficiency was higher than that of Example 1 (constant temperature case), and a temperature rise effect by the electric heater was observed. This is considered to be because of the following reasons. In gas conditions of HCCI combustion, Rh of the first catalyst B was in an oxidation state. Thus, in Example 1 (constant temperature case), even when NOx was caused to flow into the first catalyst B by switching from HCCI to SI, Rh did not immediately become effective for reduction of NOx. On the other hand, in Example 2 (temperature rise case), the temperature rise by the first catalyst B in the switching caused oxidation reactions of HC and CO to proceed in the first catalyst B, and accordingly, Rh become a reduced state (metal state). Thus, Rh became effective for NOx reduction purification after the switching, and NOx purification efficiency was enhanced in Example 2 (temperature rise case).

For the foregoing reasons, when the electric heater is disposed upstream of the first catalyst in the exhaust gas flow direction and the electric heater is operated in switching from HCCI to SI, the NOx purification efficiency in this switching transition increases.

Figure 18:
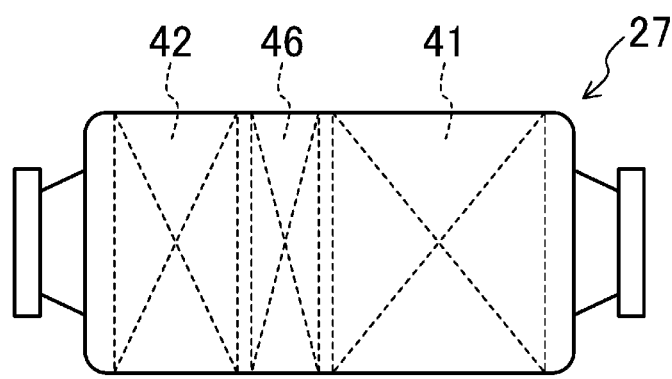
FIG. 18 is a side view illustrating another example of the exhaust gas purification catalyst device provided with the electric heater.

As shown in FIG. 18, in the case where the second catalyst 42 is disposed upstream of the first catalyst 41 in the exhaust gas flow direction, the electric heater 46 as an external heating unit is disposed between the first catalyst 41 and the second catalyst 42.

<Conclusion>

From the foregoing results, the following conclusion can be obtained.

The second catalyst as the Pt-containing catalyst single layer containing neither Pd nor Rh has a higher iso-pentane purification efficiency, from the temperature when the temperature of an exhaust gas is low, than the first catalyst including the Pd-containing catalyst layer and the Rh-containing catalyst layer and the Pt-containing first catalyst (FIG. 12), but the propylene purification efficiency is higher in the first catalyst and the Pt-containing first catalyst than in the second catalyst (FIG. 15).

Thus, to efficiently purify both saturated HC typified by iso-pentane and unsaturated HC typified by propylene from when the temperature of an exhaust gas is low, it is preferable to provide a catalyst including a Pd-containing catalyst layer and a Rh-containing catalyst layer for purification of unsaturated HC and also additionally providing a Pt-only catalyst (second catalyst) for purification of saturated HC, rather than providing a single catalyst containing a Pt catalyst, a Pd catalyst, and a Rh catalyst, such as a Pt-containing first catalyst.

Although the first catalyst including the Pd-containing catalyst layer and the Rh-containing catalyst layer is effective for purification of unsaturated HC, the Pt-containing first catalyst also shows a relatively high purification efficiency for unsaturated HC (FIG. 15). Thus, a Pt catalyst may be added to the Pd-containing catalyst layer and the Rh-containing catalyst layer or a Pt-containing catalyst layer may be stacked.

From the results shown in FIGS. 7 to 11, to enhance purification performance of HC, CO, and NOx, the first catalyst and the Pt-containing first catalyst preferably employ a Rh-loaded Zr-based composite oxide subjected to a reduction treatment and also preferably employ a Rh-doped CeZr-based composite oxide binder subjected to a reduction treatment.

In the case of starting the engine in the SI combustion mode, an exhaust gas containing a large amount of unsaturated HC is exhausted from the engine. To efficiently purify unsaturated HC at the start of the engine having a low exhaust gas temperature, the first catalyst or the Pt-containing first catalyst effective for purification of unsaturated HC is preferably provided upstream of the second catalyst to increase the catalyst temperature in an early stage (early activation).

In a case where a honeycomb substrate having a small thermal capacity is used for the second catalyst, heat of the exhaust gas facilitates an increase in the catalyst temperature. In particular, in a case where the second catalyst is disposed downstream of the first catalyst or the Pt-containing first catalyst in the flow direction of the exhaust gas, this configuration is advantageous for early activation of the second catalyst in starting the engine.

In a case where the electric heater is disposed upstream of the first catalyst in the exhaust gas flow direction and is operated to heat the first catalyst in switching of the combustion mode of the engine from HCCI combustion to SI combustion, NOx purification efficiency in this switching transition can be enhanced.

DESCRIPTION OF REFERENCE CHARACTERS 1 engine
27 exhaust gas purification catalyst device
41 first catalyst
42 second catalyst
43 Pd-containing catalyst layer
44 Rh-containing catalyst layer
45 honeycomb substrate
46 electric heater
51 CeZr-based composite oxide
52 Rh
53 Rh-loaded CeZr-based composite oxide
54 Zr-based composite oxide
55 Rh-loaded Zr-based composite oxide
56 activated alumina
57 binder
58 activated alumina
59 Pd
60 Pd-loaded alumina
61 CeZr-based composite oxide
62 Pd-loaded CeZr-based composite oxide
63 CeZr-based composite oxide
64 binder
65 honeycomb substrate 66 Pt-containing catalyst layer
67 Pt
68 Pt-loaded alumina
69 binder

The invention claimed is:

1. An exhaust gas purification catalyst device for purifying saturated hydrocarbon and unsaturated hydrocarbon included in an exhaust gas from an engine configured to operate with selective switching between a spark ignition combustion mode and a homogeneous charge compression ignition combustion mode, the exhaust gas purification catalyst device comprising:
   a first catalyst including a Pd-containing catalyst layer and a Rh-containing catalyst layer; and
   a second catalyst containing Pt-loaded alumina and containing neither Rh nor Pd, wherein
   the first catalyst or the second catalyst is disposed in one place in such a manner that the first catalyst is located upstream of the second catalyst in a flow direction of the exhaust gas,
   a heating unit configured to heat an exhaust gas flowing into the first catalyst is disposed upstream of the first catalyst in the flow direction of the exhaust gas, the heating unit is operated in switching the engine from the homogeneous charge compression ignition combustion mode to the spark ignition combustion mode,
   the engine is started in the spark ignition combustion mode,
   the first catalyst shows activity to purification of the unsaturated hydrocarbon at a temperature lower than the second catalyst, and
   the second catalyst shows activity to purification of the saturated hydrocarbon at a temperature lower than the first catalyst.

2. The exhaust gas purification catalyst device of claim 1, wherein
   the first catalyst includes a honeycomb substrate supporting the Pd-containing catalyst layer and the Rh-containing catalyst layer,
   the second catalyst includes a honeycomb substrate supporting the Pt-loaded alumina, and
   the honeycomb substrate of the second catalyst has a thermal capacity smaller than a thermal capacity of the honeycomb substrate of the first catalyst.

3. The exhaust gas purification catalyst device of claim 1, wherein
   the Pd-containing catalyst layer of the first catalyst contains Pd-loaded alumina and a Pd-loaded CeZr-based composite oxide.

4. The exhaust gas purification catalyst device of claim 1, wherein
   the first catalyst and the second catalyst are disposed in series and housed in one container.

5. The exhaust gas purification catalyst device of claim 1, wherein
   the first catalyst is a catalyst including the Pd-containing catalyst layer and the Rh-containing catalyst layer and containing Pt.

6. The exhaust gas purification catalyst device of claim 1, wherein
   the first catalyst shows activity to purification of propylene as the unsaturated hydrocarbon at a temperature lower than the second catalyst, and
   the second catalyst shows activity to purification of isopentane as the saturated hydrocarbon at a temperature lower than the first catalyst.

7. An exhaust gas purification method for purifying saturated hydrocarbon and unsaturated hydrocarbon included in an exhaust gas from an engine configured to operate with selective switching between a spark ignition combustion mode and a homogeneous charge compression ignition combustion mode, wherein
   a first catalyst including a Pd-containing catalyst layer and a Rh-containing catalyst layer and a second catalyst containing Pt-loaded alumina and containing neither Rh nor Pd are used,
   the first catalyst or the second catalyst is disposed in one place in such a manner that the first catalyst is located upstream of the second catalyst in a flow direction of the exhaust gas,
   a heating unit configured to heat an exhaust gas flowing into the first catalyst is disposed upstream of the first catalyst in the flow direction of the exhaust gas,
   the engine is started in the spark ignition combustion mode,
   the heating unit is operated in switching the engine from the homogeneous charge compression ignition combustion mode to the spark ignition combustion mode, and
   the saturated hydrocarbon is purified mainly by the second catalyst and the unsaturated hydrocarbon is purified mainly by the first catalyst.

8. An exhaust gas purification catalyst device for purifying saturated hydrocarbon and unsaturated hydrocarbon included in an exhaust gas from an engine configured to operate with selective switching between a spark ignition combustion mode and a homogeneous charge compression ignition combustion mode, the exhaust gas purification catalyst device comprising:
   a first catalyst including a Pd-containing catalyst layer and a Rh-containing catalyst layer; and
   a second catalyst containing Pt-loaded alumina and containing neither Rh nor Pd, wherein the first catalyst or the second catalyst is disposed in one place in such a manner that the first catalyst is located upstream of the second catalyst in a flow direction of the exhaust gas,
   the Rh-containing catalyst layer of the first catalyst is stacked on the Pd-containing catalyst layer,
   the Rh-containing catalyst layer contains a Rh-doped CeZr-based composite oxide binder having a median diameter of 300 nm or less,
   a heating unit configured to heat an exhaust gas flowing into the first catalyst is disposed upstream of the first catalyst in the flow direction of the exhaust gas,
   the heating unit is operated in switching the engine from the homogeneous charge compression ignition combustion mode to the spark ignition combustion mode, and
   the first catalyst shows activity to purification of the unsaturated hydrocarbon at a temperature lower than the second catalyst, and
   the second catalyst shows activity to purification of the saturated hydrocarbon at a temperature lower than the first catalyst.

9. The exhaust gas purification catalyst device of claim 8, wherein
   the first catalyst includes a honeycomb substrate supporting the Pd-containing catalyst layer and the Rh-containing catalyst layer,
   the second catalyst includes a honeycomb substrate supporting the Pt-loaded alumina, and the honeycomb substrate of the second catalyst has a thermal capacity smaller than a thermal capacity of the honeycomb substrate of the first catalyst.

10. The exhaust gas purification catalyst device of claim 8, wherein
the Pd-containing catalyst layer of the first catalyst contains Pd-loaded alumina and a Pd-loaded CeZr-based composite oxide.

11. The exhaust gas purification catalyst device of claim 8, wherein
the first catalyst and the second catalyst are disposed in series and housed in one container.

12. The exhaust gas purification catalyst device of claim 8, wherein
the first catalyst is a catalyst including the Pd-containing catalyst layer and the Rh-containing catalyst layer and containing Pt.

13. The exhaust gas purification catalyst device of claim 8, wherein
the first catalyst shows activity to purification of propylene as the unsaturated hydrocarbon at a temperature lower than the second catalyst, and
the second catalyst shows activity to purification of isopentane as the saturated hydrocarbon at a temperature lower than the first catalyst.

* * * * *